US012649576B2

(12) United States Patent
Lim et al.

(10) Patent No.: US 12,649,576 B2
(45) Date of Patent: Jun. 9, 2026

(54) AERIAL PAYLOAD DEPLOYMENT SYSTEM AND METHOD OF OPERATING THEREOF

(71) Applicant: Singapore University of Technology and Design, Singapore (SG)

(72) Inventors: Jon Hui Ryan Lim, Singapore (SG); Hui Qing Kristabel Lim, Singapore (SG); Shaohui Foong, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 0 days.

(21) Appl. No.: 18/992,415

(22) PCT Filed: Jul. 7, 2023

(86) PCT No.: PCT/SG2023/050476
§ 371 (c)(1),
(2) Date: Jan. 8, 2025

(87) PCT Pub. No.: WO2024/010528
PCT Pub. Date: Jan. 11, 2024

(65) Prior Publication Data
US 2025/0353593 A1     Nov. 20, 2025

(30) Foreign Application Priority Data
Jul. 8, 2022    (SG) ........................... 10202250415X

(51) Int. Cl.
*B64D 1/12*        (2006.01)
*B64F 1/32*        (2006.01)
(Continued)

(52) U.S. Cl.
CPC .................. *B64D 1/12* (2013.01); *B64F 1/32* (2013.01); *B64U 20/00* (2023.01); *B64U 2101/67* (2023.01)

(58) Field of Classification Search
CPC ....... B64D 1/12; B64U 70/30; B64U 2101/67
See application file for complete search history.

(56) References Cited

U.S. PATENT DOCUMENTS 8,800,930 B1    8/2014    Bourakov et al.
9,139,304 B2    9/2015    Frucht
(Continued)

OTHER PUBLICATIONS

Chee How Tan et al., "Efficient design principles for designing innovative aerial robots," ASME(American Society of Mechanical Engineers), Aug. 17-20, 2021 (12 pages).
(Continued)

*Primary Examiner* — Nicholas A McFall
(74) *Attorney, Agent, or Firm* — Osha Bergman Watanabe & Burton LLP

(57)        ABSTRACT

An aerial payload deployment system includes: an aerial vehicle including a flight controller operable to control a flight of the aerial vehicle; and a payload deployment system coupled to the aerial vehicle and configured to deploy a payload to an elevated lateral pole-like structure. The payload deployment system includes: a tethered payload system including: a tether having a first end portion and a second end portion; and a counterweight coupled to the first end portion of the tether, the second end portion of the tether being coupled to the payload to be deployed; and a payload release system configured to releasably secure the tethered payload system and is actuatable to release the tethered payload system in a manner such that when the tethered payload system descends towards the elevated lateral pole-like structure after being released, the counterweight is spaced laterally apart from the payload.

22 Claims, 32 Drawing Sheets

(51) Int. Cl.
    *B64U 20/00*      (2023.01)
    *B64U 101/67*      (2023.01)

(56) References Cited

U.S. PATENT DOCUMENTS

| | | |
|---|---|---|
| 9,969,494 B1 | 5/2018 | Buchmueller et al. |
| 2022/0119115 A1 | 4/2022 | Gooch et al. |

OTHER PUBLICATIONS

Suseong Kim et al., "Aerial manipulation using a quadrotor with a two DOF robotic arm", 2013 IEEE/RSJ International Conference on Intelligent Robots and Systems, Nov. 3-7, 2013, (6 pages).
Alejandro Suarez, et al., "Design of a lightweight dual arm system for aerial manipulation", Elsevier, Mechatronics, Apr. 2018, vol. 50, pp. 30-44 (15 pages).
Daniel K. D. Villa et al., "A Survey on Load Transportation Using Multirotor UAVs", Journal of Intelligent & Robotic Systems, Oct. 2019, vol. 98, No. 2, pp. 267-296 (30 pages).
Moju Zhao et al., "Whole-body aerial manipulation by transformable multirotor with two-dimensional multilinks", IEEE International Conference on Robotics and Automation (ICRA), May 2017 (8 pages).

Hossein Bonyan Khamseh et al., "Aerial manipulation—a literature survey", Elsevier, Robotics and Autonomous Systems, Sep. 2018, vol. 107, pp. 221-235 (15 pages).
Alejandro Suarez et al., "Design of an anthropomorphic, compliant, and lightweight dual arm for aerial manipulation," IEEE Access, vol. 6, pp. 29173-29 189(17 pages).
Matthew A. Estrada et al., "Forceful manipulation with micro air vehicles", Science Robotics, Oct. 2018, vol. 3, No. 23 (7 pages).
L. Tarassuk, "The complete encyclopeida of arms weapons", New York: Simon and Schuster, 1982 (1 page).
Kavinda Jayawardana et al, Capstan equation generalised for noncircular geometries, Dec. 25, 2020 (27 pages).
Vladimir Shiryaev et al., "Extension of One-Dimensional Models for Hyperelastic String Structures under Coulomb Friction with Adhesion" Lubricatns, Apr. 2018, vol. 6, No. 2, p. 33 (18 pages).
J.B. Coulibaly et al., "Sliding cable modeling: An attempt at a unified formulation" Elsevier, International Journal of Solids and Structures, Jan. 2018, vol. 130-131, pp. 1-10 (10 pages).
Alexander Konyukhov, "Contact of ropes and orthotropic rough surfaces" ZAMM—Journal of Applied Mathematics and Mechanics, Nov. 2013, vol. 95, No. 4, pp. 406-423 (18 pages).
Alexander Konyukhow et al., "Computational Contact Mechanics: Geometrically Exact Theory for Arbitrary Shaped Bodies" (454 pages).
Sarah Tang et al., "Aggressive Flight With Suspended Payloads Using Vision-Based Control", IEEE Robotics and Automation Letters, Apr. 2018, vol. 3, No. 2, pp. 1152-1159 (8 pages).
George W. Housner et al., "Applied Mechanics Dynamics" Second Edition, 1980, Pasadena, CA: California Institute of Technology (399 pages).

200 navigating, based on a flight navigation command signal for controlling a movement of the aerial vehicle received by the flight controller of the aerial vehicle, the aerial vehicle to a position above an elevated lateral pole-like structure for deploying a payload to the elevated lateral pole-like structure

202 actuating the payload release system to release the tethered payload system in a manner such that when the tethered payload system descends towards the elevated lateral pole-like structure after being released for the elevated lateral pole-like structure, the counterweight is spaced laterally apart from the payload, and the payload and the counterweight are at opposite sides of the elevated lateral pole-like structure when the tether reaches and contacts with the elevated lateral pole-like structure

402
providing or forming an aerial vehicle comprising a flight controller operable to control a flight of the aerial vehicle 404
providing or forming a payload deployment system coupled or couplable to the aerial vehicle and configured to deploy a payload to an elevated lateral pole-like structure

TABLE I
SIMULATION CONSTANTS AND VARIABLES

| Simulation constants | | |
|---|---|---|
| Tether length, $r_{total}$ (m) | | 1.5 |
| Friction coefficient, $\mu$ | | 0.3 |
| Damping coefficient, $c$ | | 0.2 |
| Pole radius, $r_{pole}$ (m) | | 0.05 |
| Duration (s) | | 0.6 |
| Gravity constant ($m/s^2$) | | 9.81 |
| | Payload | Counterweight |
| Mass, $m$ (kg) | 0.281 | 0.051 |
| Radial offset $r_{p_i}, r_{cw_i}$ (m) | 0.05 - 1.25 | 0.25 - 1.45 |
| Angular offset $\theta_{p_i}, \theta_{cw_i}$ (rad) | $\pi$ | $-\pi/2 - \pi/2$ |

TABLE II
LIST AND RANGE OF EXPERIMENTAL VARIABLES.

| Experimental variables | |
| --- | --- |
| Payload mass, $m_p$ (g) | 284 – 607 |
| Counterweight mass (non-magnetic), $m_{cw}$ (g) | 36 – 66 |
| Counterweight mass (magnetic), $m_{cw}$ (g) | 51 |
| Tether length, $r_{total}$ (m) | 1.2 – 2.0 |
| Payload offset, $r_{p_i}$ (m) | 0.1 – 0.8 |
| Drop height to pole, $h$ (m) | 0.7 – 0.8 |

AERIAL PAYLOAD DEPLOYMENT SYSTEM AND METHOD OF OPERATING THEREOF

CROSS-REFERENCE TO RELATED APPLICATION

This application claims the benefit of priority of Singapore Patent Application No. 10202250415X, filed on 8 Jul. 2022, the content of which being hereby incorporated by reference in its entirety for all purposes.

TECHNICAL FIELD

The present invention generally relates to an aerial payload deployment system, a method of operating the aerial payload deployment system and a method of forming the aerial payload deployment system.

BACKGROUND

Load transportation and manipulation remain an active field of research in aerial robotics, given the constraints on size, weight and power (SWaP) placed on flight platforms. Arm-based unmanned aerial manipulators (UAMs) are straightforward ways of adding manipulation capabilities, but necessitate large platforms to accommodate multiple actuators. Other works have proposed reusing a combination of existing on-board systems (e.g., propulsion, structure) to reduce actuation requirements and increase structural efficiency to accomplish manipulation tasks. However, such conventional systems are ill-suited for attaching heavier objects to pole-like structures, owing to unstable dynamics, large torque requirements for overcoming gravity and disabling of flight functions. Additionally, rotorcraft (e.g., quadrotor) performance can vary significantly near objects such as the ground or walls. Furthermore, certain UAMs are dependent on accurate localisation systems (e.g. VICON systems, vision-based tracking) for manipulator control, further constraining their context of operation.

A need therefore exists to provide an aerial payload deployment system, as well as a method of operating thereof, that seeks to overcome, or at least ameliorate, one or more deficiencies in conventional aerial payload deployment systems, and more particularly, that enables a different way and/or an efficient and effective way of deploying a payload. It is against this background that the present invention has been developed.

SUMMARY

According to a first aspect of the present invention, there is provided an aerial payload deployment system comprising:

an aerial vehicle comprising a flight controller operable to control a flight of the aerial vehicle; and
a payload deployment system coupled or couplable to the aerial vehicle and configured to deploy a payload to an elevated lateral pole-like structure, the payload deployment system comprising:
a tethered payload system comprising: a tether having a first end portion and a second end portion; and a counterweight coupled to the first end portion of the tether, the second end portion of the tether being coupled or couplable to the payload to be deployed; and
a payload release system configured to releasably secure the tethered payload system and is actuatable to release the tethered payload system in a manner such that when the tethered payload system descends towards the elevated lateral pole-like structure after being released for the elevated lateral pole-like structure, the counterweight is spaced laterally apart from the payload, and the payload and the counterweight are at opposite sides of the elevated lateral pole-like structure when the tether reaches and contacts with the elevated lateral pole-like structure.

According to a second aspect of the present invention, there is provided a method of operating the aerial payload deployment system according to the above-mentioned first aspect of the present invention, the method comprising:

navigating, based on a flight navigation command signal for controlling a movement of the aerial vehicle received by the flight controller of the aerial vehicle, the aerial vehicle to a position above an elevated lateral pole-like structure for deploying a payload to the elevated lateral pole-like structure; and
actuating the payload release system to release the tethered payload system in a manner such that when the tethered payload system descends towards the elevated lateral pole-like structure after being released for the elevated lateral pole-like structure, the counterweight is spaced laterally apart from the payload, and the payload and the counterweight are at opposite sides of the elevated lateral pole-like structure when the tether reaches and contacts with the elevated lateral pole-like structure.

According to a third aspect of the present invention, there is provided a method of forming an aerial payload deployment system (e.g., the aerial payload deployment system according to the above-mentioned first aspect of the present invention). The method comprises:

providing or forming an aerial vehicle comprising a flight controller operable to control a flight of the aerial vehicle; and
providing or forming a payload deployment system coupled or couplable to the aerial vehicle and configured to deploy a payload to an elevated lateral pole-like structure, the payload deployment system comprising:
a tethered payload system comprising: a tether having a first end portion and a second end portion; and a counterweight coupled to the first end portion of the tether, the second end portion of the tether being coupled or couplable to the payload to be deployed; and
a payload release system configured to releasably secure the tethered payload system and is actuatable to release the tethered payload system in a manner such that when the tethered payload system descends towards the elevated lateral pole-like structure after being released for the elevated lateral pole-like structure, the counterweight is spaced laterally apart from the payload, and the payload and the counterweight are at opposite sides of the elevated lateral pole-like structure when the tether reaches and contacts with the elevated lateral pole-like structure.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 2 depicts a schematic flow diagram of a method of operating the aerial payload deployment system, according to various embodiments of the present invention;

DETAILED DESCRIPTION

Various embodiments of the present invention provide an aerial payload deployment system, a method of operating the aerial payload deployment system and a method of forming the aerial payload deployment system. In this regard, as described in the background, various embodiments provide an aerial payload deployment system, as well as a method of operating thereof, that seeks to overcome, or at least ameliorate, one or more deficiencies in conventional aerial payload deployment systems, and more particularly, that enables a different way and/or an efficient and effective way of deploying a payload.

Figure 1:
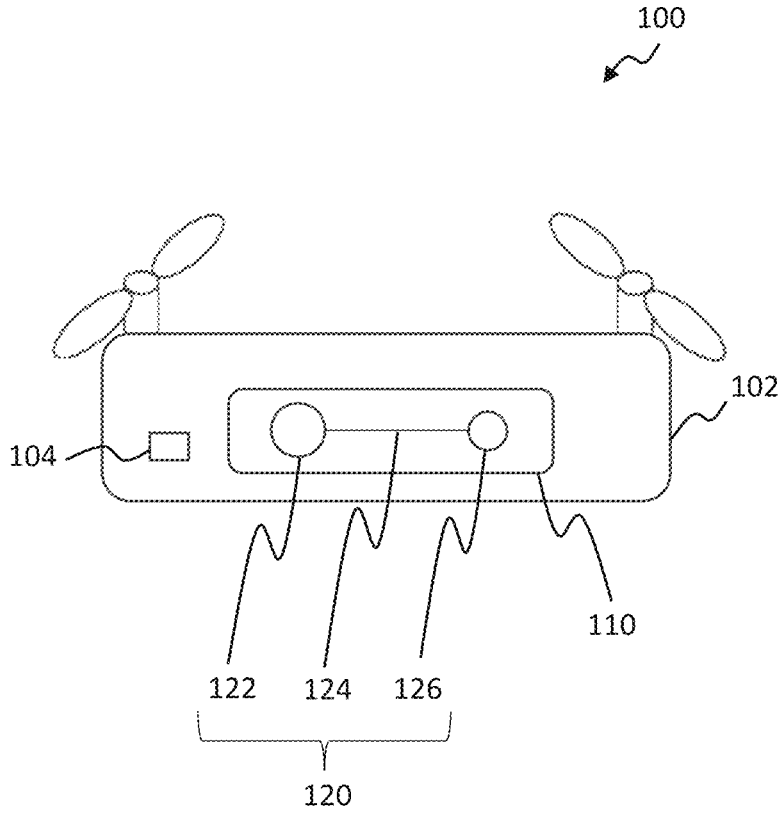
FIG. 1 depicts a schematic drawing of an aerial payload deployment system, according to various embodiments of the present invention.

FIG. 1 depicts a schematic drawing of an aerial payload deployment system 100 according to various embodiments of the present invention. The aerial payload deployment system 100 comprises: an aerial vehicle 102 comprising a flight controller 104 operable to control a flight of the aerial vehicle 102; and a payload deployment system 110 coupled or couplable to the aerial vehicle 102 and configured to deploy a payload 122 to an elevated lateral pole-like structure 150. In particular, the payload deployment system 110 comprises: a tethered payload system 120 comprising: a tether 124 having a first end portion and a second end portion; and a counterweight 126 coupled to the first end portion of the tether 124, the second end portion of the tether 124 being coupled or couplable to the payload 122 to be deployed; and a payload release system (not shown in FIG. 1) configured to releasably secure the tethered payload system 120 and is actuatable to release the tethered payload system 120 in a manner such that when the tethered payload system 120 descends towards the elevated lateral pole-like structure 150 after being released for the elevated lateral pole-like structure 150, the counterweight 126 is spaced laterally apart from the payload 122, and the payload 122 and the counterweight 126 are at opposite sides of the elevated lateral pole-like structure 150 when the tether 124 reaches and contacts with the elevated lateral pole-like structure 150.

It will be appreciated by a person skilled in the art that the present invention is not limited to any particular type of aerial vehicle as long as the aerial vehicle has a flight controller 104 operable (e.g., based on a flight navigation command signal received) to control a flight of the aerial vehicle to navigate to a target position above a desired elevated lateral pole-like structure 150 for deploying a payload 122 to the elevated lateral pole-like structure 150. Accordingly, it will be appreciated by a person skilled in the art that the aerial vehicle may be any aerial vehicle known in the art (e.g., commercially available) as desired or as appropriate, for example, an unmanned aerial vehicle (UAV), such as but not limited to, a rotorcraft (e.g., quad-copter).

In various embodiments, the payload deployment system 110 may be integrally coupled to (i.e., integrally formed with) the aerial vehicle 102 or may be releasably/detachably coupled to the aerial vehicle 102. For example, the payload deployment system 110 may be coupled to an exterior of the aerial vehicle. For example, the payload deployment system 110 may be releasably/detachably secured to the aerial vehicle 102. It will be appreciated by a person skilled in the art that the payload deployment system 110 may be coupled to the aerial vehicle 102 in any manner as desired or as appropriate as long as the payload deployment system 110 is able to function or operate to deploy the payload 122 to the elevated lateral pole-like structure 150 in the manner as described herein according to various embodiments.

It will be appreciated by a person skilled in the art that the term "pole-like structure" refers to any structure that generally resembles, or is, a pole, which may also be more generally referred to as an elongated structure. For example, it is not necessary for the pole-like structure to have a circular cross-section. Furthermore, an elevated lateral pole-like structure refers to any pole-like structure that is elevated from the ground and is oriented generally laterally (e.g., extending sideway) such that at least a portion thereof is able to receive (e.g., make contact with) the tether 124 of the tethered payload system 120 released or dropped from above for securing the tethered payload system 120 thereto. It will be appreciated by a person skilled in the art that, although it may be preferred in various embodiments, it is not necessary for the elevated lateral pole-like structure 150 to be strictly parallel to the ground (or strictly horizontal) and that the elevated lateral pole-like structure 150 may be slanted in various degrees as long as at least a portion thereof is able to receive (e.g., make contact with) the tether 124 of the tethered payload system 120 deployed or dropped from above for securing the tethered payload system 120 thereto. For example, the elevated lateral pole-like structure 150 may have a slope (with respect to a horizontal direction) of about ±45 degrees or less, or more preferably about ±35 degrees or less, or more preferably about ±20 degrees or less, or more preferably about ±10 degrees or less, or more preferably about ±5 degrees or less, or more preferably about 0 degrees (i.e., horizontal). It will also be appreciated by a person skilled in the art that the elevated lateral pole-like structure 150 may be man-made or naturally occurring. By way of examples only and without limitation, examples of the elevated lateral pole-like structure 150 may include an overhanging portion (or arm portion) of a lamp post or street light, an overhanging portion (or arm portion) of a traffic light pole, a tree branch, scaffolding, a suspended cable, a strut member and so on.

In various embodiments, the tethered payload system 110 is configured such that, after the tether 124 reaches and contacts with the elevated lateral pole-like structure 150, the counterweight 126 rotates about the elevated lateral pole-like structure 150 thereby causing a portion of the tether 124 up to the first end portion of the tether 124 to wrap around the elevated lateral pole-like structure 150 until the counterweight 126 engages therewith and thereby securing the payload 122 to the elevated lateral pole-like structure 150.

In various embodiments, the payload 122 may be any object(s)/item(s) desired to be deployed and the counterweight 126 may be any object(s)/item(s) that may function or serve as a counterweight with respect to the payload 122 desired to be deployed. In various embodiments, the counterweight 126 may have a circular cross-section such as a disc shape. In various embodiments, the counterweight 126 may comprise one or more legs/arms or protruding members for facilitating engagement and attachment of the counterweight 126 with or to the elevated lateral pole-like structure 150 for securing the payload 122 thereto after wrapping around the elevated lateral pole-like structure 150. In various embodiments, the above-mentioned one or more legs/arms may comprise two or more or four or more legs/arms. In various embodiments, the above-mentioned one or more legs/arms may be retractable. In this regard, prior to the counterweight 126 being released or deployed or when the counterweight 126 is being stored (i.e., in a stored state, e.g., in a launcher as will be described later below according to various second embodiments), the above-mentioned one or more legs/arms may be in a retracted state within a main body of the counterweight 126 (or within the cross-sectional outer/peripheral edge profile of the main body of the counterweight 126, such as under or over the main body of the counterweight 126). After the counterweight 126 has been released or deployed, the above-mentioned one or more legs/arms may be released (e.g., automatically) to a released/ protruding state which protrude out from the main body of the counterweight 126 (e.g., protruding out from the cross-sectional outer/peripheral profile of main body of the counterweight 126) for facilitating engagement and attachment of the counterweight 126 with or to the elevated lateral pole-like structure 150.

Accordingly, the aerial payload deployment system 100 according to various embodiments of the present invention advantageously enables a different way and/or an efficient and effective way of deploying a payload 122. In particular, the aerial payload deployment system 100 is advantageously configured to release the tethered payload system 120 in a manner such that when the tethered payload system 120 descends towards the elevated lateral pole-like structure 150 after being released for the elevated lateral pole-like structure 150, the counterweight 126 is spaced laterally apart from the payload 122, and the payload 122 and the counterweight 126 are at opposite sides of the elevated lateral pole-like structure 150 when the tether 124 reaches and contacts with the elevated lateral pole-like structure 150. Furthermore, the tethered payload system 120 is configured such that, after the tether 124 reaches and contacts with the elevated lateral pole-like structure 150, the counterweight 126 rotates about the elevated lateral pole-like structure 150 thereby causing a portion of the tether 124 up to the first end portion of the tether 124 to wrap around the elevated lateral pole-like structure 150 until the counterweight 126 engages therewith and thereby securing the payload 122 to the elevated lateral pole-like structure 150.

Accordingly, the aerial payload deployment system 100 advantageously enables a different way of deploying a payload 122, such as compared with various conventional aerial payload deployment systems as described in the background which require large platforms for adding manipulation capabilities (e.g., arm-based). Furthermore, the aerial payload deployment system 100 advantageously enables an efficient and effective way of deploying the payload 122, for example, without the complicated manipulation systems associated with various conventional aerial payload deployment systems as described in the background but yet is able to effectively/robustly deploy the payload 122, and more specifically, effectively/robustly deploy and secure the payload 122 to an elevated lateral pole-like structure 150. For example, the aerial payload deployment system 100 enables a payload 122 to be delivered or entangled onto a pole-like structure 150 by the aerial vehicle 102 (e.g., a rotorcraft) remotely (i.e., at a distance from the pole-like structure 150), without any physically connected portions or subsystems of the aerial payload deployment system 100 (e.g., grippers or arms) coming into contact with the pole-like structure 150. Furthermore, the simplicity of operation (just releasing the tethered payload system 120 including the payload 122 and the counterweight 126 at a target position over a target pole-like structure 150) compared to utilizing arms or grippers in conventional aerial payload deployment systems advantageously enables a comparatively heavy payload to be secured to the target pole-like structure 150 without complicating the aerial vehicle's dynamics, for example, making the aerial payload deployment system 100 an efficient and effective "drop-and-forget" system. These advantages or technical effects, and/or other advantages or technical effects, will become more apparent to a person skilled in the art as the aerial payload deployment system 100 is described in more detail according to various embodiments and example embodiments of the present invention.

In various embodiments, the counterweight 126 is magnetic for facilitating engagement with the elevated lateral pole-like structure 150 for securing the payload 122 to the elevated lateral pole-like structure 150. In this regard, the elevated lateral pole-like structure 150 may be made of a ferrous material (a ferrous metal). In this regard, forming the counterweight 126 as a magnetic counterweight has been found to significantly improve the deployment success rate (or capture success rate) by enhancing the ability of the counterweight 126 to engage and attach to the elevated lateral pole-like structure 150 after wrapping around the elevated lateral pole-like structure 150.

In various embodiments, the counterweight 126 is lighter than the payload 122.

In various embodiments, in the case of the counterweight 126 being non-magnetic, the counterweight 126 is lighter than the payload 122 and a weight ratio of the payload 122 to the counterweight 126 is up to about 6:1.

In various embodiments, in the case of the counterweight 126 being magnetic, the counterweight 126 is lighter than the payload 122 and a weight ratio of the payload 122 to the counterweight 126 is up to about 12:1. In this regard, a magnetic counterweight 126 has been found to significantly improve the weight ratio capability of the payload 122 to the counterweight 126.

In various first embodiments, the payload deployment system 110 comprises an elongated frame structure (e.g., a carbon fiber reinforced polymer (CFRP) rod). In this regard, the payload release system comprises: a first actuatable release mechanism and a second actuatable release mechanism located at a first section and a second section, respectively, of the elongated frame structure. In this regard, the first and second sections are spaced apart from each other and the first and second actuatable release mechanisms are configured to releasably secure the counterweight 126 and the payload 122, respectively. The payload release system further comprises a release controller communicatively coupled to the first and second actuatable release mechanisms and is operable to actuate the first and second actuatable release mechanisms to release the counterweight 126 and the payload 122, respectively.

In various first embodiments, the first and second sections are spaced apart from each other with a distance therebetween of about 50% to 100% of the entire operating length of the tether 124. In various first embodiments, the above-mentioned distance may more preferably be about 60% to 100%, or more preferably be about 70% to 100%, or more preferably be about 75% to 95%, or more preferably be about 85% to 95%. In various first embodiments, the above-mentioned distance may be configured such that no or negligible tension is created in the tether 124 when the tethered payload system 120 is secured to the payload release system. In this regard, various first embodiments found that a taut tether may result in an undesirable effect of pulling the payload 122 and the counterweight 126 out of position upon release.

In various embodiments, an operating length of the tether 124 refers to a length of the tether 124 between the first end portion and the second end portion of the tether 124, that is, a length of the tether 124 between the counterweight 126 and the payload 122. In this regard, in various embodiments, an operating length of the tether 124 may be adjustable, for example, the tether 124 may be retractable at the first end portion and/or the second end portion thereof, such as similar to a retractable measuring tape.

Accordingly, in various first embodiments, the first actuatable release mechanism and the second actuatable release mechanism are located at the first section and the second section, respectively, of the elongated frame structure, whereby the first and second sections are spaced apart from each other, such that when the first and second actuatable release mechanisms are actuated to release the counterweight 126 and the payload 122, respectively, the tethered payload system 120 descends towards the elevated lateral pole-like structure 150 and the counterweight 126 is spaced laterally apart from the payload 122 (e.g., corresponding to the distance in which the first and second sections (i.e., the first and second actuatable release mechanisms) are spaced apart), and the payload 122 and the counterweight 126 are at opposite sides of the elevated lateral pole-like structure 150 when the tether 124 reaches and contacts with the elevated lateral pole-like structure 150. Thereafter, the counterweight 126 rotates about the elevated lateral pole-like structure 150 thereby causing a portion of the tether 124 up to the first end portion of the tether 124 to wrap around the elevated lateral pole-like structure 150 until the counterweight 126 engages therewith and thereby securing the payload 122 to the elevated lateral pole-like structure 150.

In various second embodiments, the payload deployment system 110 comprises a launcher comprising a chamber (or a cavity) for housing the counterweight 126. In this regard, the payload release system comprises: a first actuatable release mechanism configured to, when actuated, trigger the launcher to eject the counterweight 126 from the chamber such that the counterweight 126 is spaced laterally apart from the payload 122 after being released for the elevated lateral pole-like structure 150; a second actuatable release mechanism configured to releasably secure the payload 122; and a release controller communicatively coupled to the first and second actuatable release mechanisms and is operable to actuate the first and second actuatable release mechanisms to trigger the launcher and release the payload 122, respectively.

In various second embodiments, the release controller is configured to release the payload 122 about 0.1 to 1 seconds after the launcher is triggered to eject the counterweight 126 from the chamber. In various second embodiments, the release controller is configured to release the payload 122 at a time instance when the counterweight 126 is estimated to drop to substantially a same level (with respect to a horizontal direction) as the payload 122 after being ejected by the launcher such that both the payload 122 and the counterweight 126 may be substantially level with each other when descending towards the elevated lateral pole-like structure 150. For example, such a time instance (or time delay) may be predetermined based on various factors, such as but not limited to, the operating length of the tether 124 and the mass of the counterweight 126, and set in the release controller. For example, depending on the operating length of the tether 124 and the mass of the counterweight 126, the time delay may be about 0.1 to 1 second, or about 0.1 to 0.5 seconds, or about 0.1 to 0.3 seconds. In various second embodiments, the release controller may be configured to release the payload 122 and trigger the launcher to eject the counterweight 124 at substantially the same time.

Accordingly, in various second embodiments, a launcher is employed for housing and ejecting the counterweight 126 such that when the first and second actuatable release mechanisms are actuated to release the counterweight 126 and the payload 122, respectively, the tethered payload system 120 descends towards the elevated lateral pole-like structure 150 and the counterweight 126 is spaced laterally apart from the payload 122 (e.g., corresponding to the distance in which the counterweight 126 is ejected away from the payload 122), and the payload 122 and the counterweight 126 are at opposite sides of the elevated lateral pole-like structure 150 when the tether 124 reaches and contacts with the elevated lateral pole-like structure 150. Thereafter, the counterweight 126 rotates about the elevated lateral pole-like structure 150 thereby causing a portion of the tether 124 up to the first end portion of the tether 124 to wrap around the elevated lateral pole-like structure 150 until the counterweight 126 engages therewith and thereby securing the payload 122 to the elevated lateral pole-like structure 150.

Figure 2:
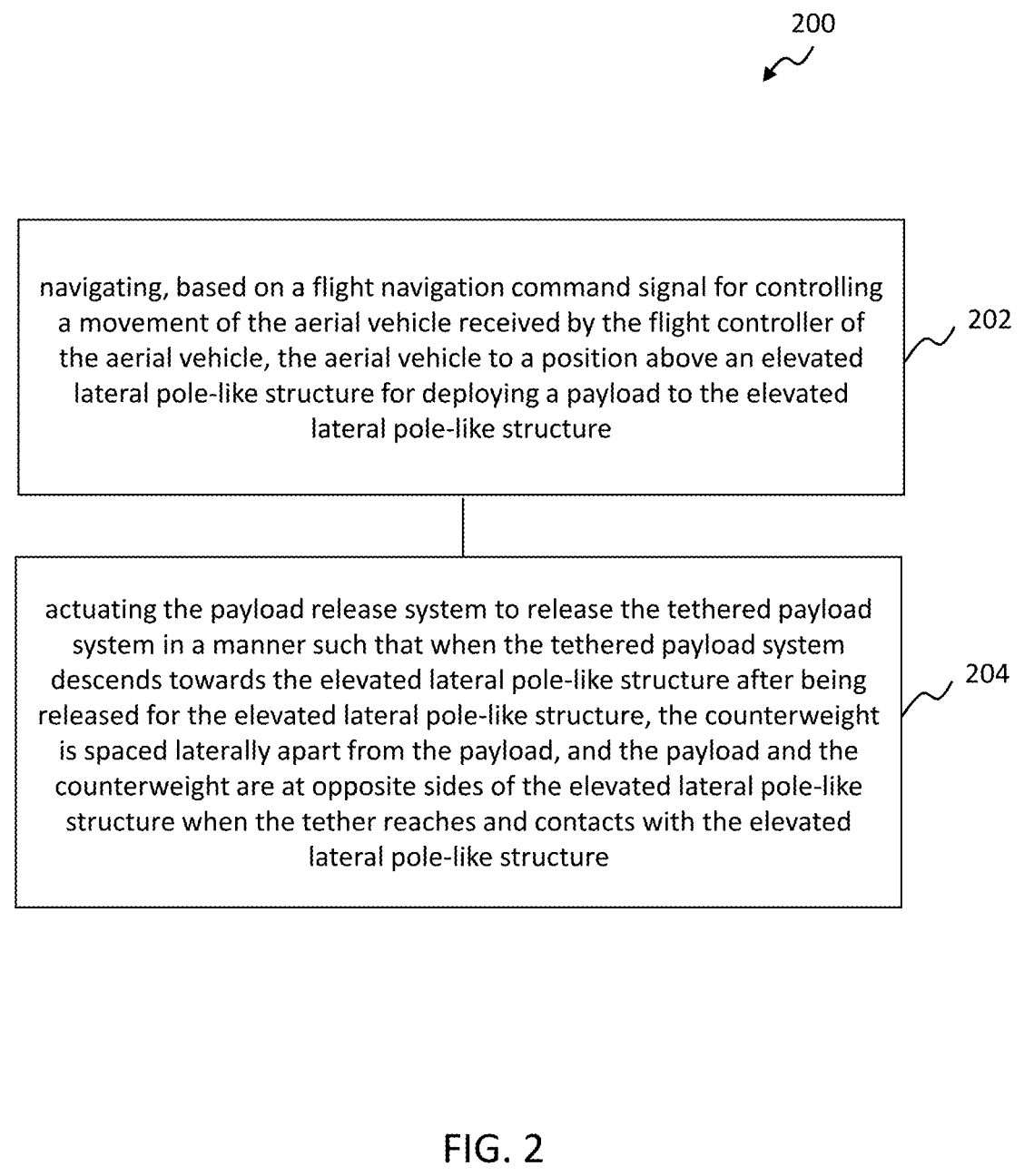

FIG. 2 depicts a schematic flow diagram of a method 200 of operating the aerial payload deployment system 100 according to various embodiments of the present invention. The method 200 comprises: navigating (at 202), based on a flight navigation command signal (e.g., either from a user input or generated autonomously based on sensor data and a target position (e.g., target release position)) for controlling a movement of the aerial vehicle 102 received by the flight controller 104 of the aerial vehicle 102, the aerial vehicle 102 to a position (e.g., a target position) above an elevated lateral pole-like structure 150 for deploying a payload 122 to the elevated lateral pole-like structure 150; and actuating (at 204) the payload release system to release the tethered payload system 120 in a manner such that when the tethered payload system 120 descends towards the elevated lateral pole-like structure 150 after being released for the elevated lateral pole-like structure 150, the counterweight 126 is spaced laterally apart from the payload 122, and the payload 122 and the counterweight 126 are at opposite sides of the elevated lateral pole-like structure 150 when the tether 124 reaches and contacts with the elevated lateral pole-like structure 150.

In various embodiments, as described hereinbefore, after the tether 124 reaches and contacts with the elevated lateral pole-like structure 150, the counterweight 126 rotates about the elevated lateral pole-like structure 150 thereby causing a portion of the tether 124 up to the first end portion to wrap around the elevated lateral pole-like structure 150 until the counterweight 126 engages therewith and thereby securing the payload 122 to the elevated lateral pole-like structure 150.

In various embodiments, when the tether 124 reaches and contacts with the elevated lateral pole-like structure 150, a ratio of a length of a portion of the tether 124 from the second end portion of the tether 124 to a point of contact with the elevated lateral pole-like structure 150 to the entire operating length of the tether 124 is about 0.25 to 0.5. In various embodiments, the ratio may preferably be about 0.3 to 0.45, or preferably be about 0.3 to 0.4.

In various embodiments, the above-mentioned position (e.g., target position) of the aerial vehicle 102 above the elevated lateral pole-like structure 150 for deploying the payload 122 to the elevated lateral pole-like structure 150 is such that the tethered payload system 120 held by the aerial vehicle 102 is at least about 0.5 m above (in height) the elevated lateral pole-like structure 150.

In various first embodiments, in the case of the payload deployment system 110 comprising an elongated frame structure, the payload release system is actuated to release the tethered payload system 120 when the aerial vehicle 102 is above the elevated lateral pole-like structure 150 (e.g., at least about 0.5 m above as described above) such that when the tether 124 reaches and contacts with the elevated lateral pole-like structure 150, the payload 122 and the counterweight 126 are at opposite sides of the elevated lateral pole-like structure 150, and more particularly according to various embodiments, a ratio of a length of a portion of the tether 124 from the second end portion of the tether 124 to a point of contact with the elevated lateral pole-like structure 150 to the entire operating length of the tether 124 is in a range of about 0.25 to 0.5. In various embodiments, for the payload 122 and the counterweight 126 to be at opposite sides of the elevated lateral pole-like structure 150, or more particularly, for a ratio of a length of a portion of the tether 124 from the second end portion to a point of contact with the elevated lateral pole-like structure 150 to the entire operating length of the tether 124 is in a range of about 0.25 to 0.5 when the tether 124 reaches and contacts with the elevated lateral pole-like structure 150, the point of actuating the payload release system, or the target position of the aerial vehicle 102 or the tethered payload system 120, to release the tethered payload system 120 may be determined based on a number of factors, such as but not limited to, the difference in height (e.g., estimation thereof) between the elevated lateral pole-like structure 150 and the tethered payload system 120, a velocity or momentum (e.g., estimation thereof) of the aerial vehicle 102 carrying the tethered payload system 120 and/or the operating length of the tether 124. Accordingly, the aerial vehicle 102 may or may not be directly over the elevated lateral pole-like structure 150 when the payload release system is actuated to release the tethered payload system 120, depending on various factors.

In various second embodiments, in the case of the payload deployment system 110 comprising a launcher comprising a chamber for housing the counterweight 126, the payload release system is actuated to release the tethered payload system 120 when the aerial vehicle 102 is above the elevated lateral pole-like structure 150 (e.g., at least about 0.5 m above as described above) such that when the tether 124 reaches and contacts with the elevated lateral pole-like structure 150, the payload 122 and the counterweight 126 are at opposite sides of the elevated lateral pole-like structure 150, and more particularly according to various embodiments, a ratio of a length of a portion of the tether 124 from the second end portion to a point of contact with the elevated lateral pole-like structure 150 to the entire operating length of the tether 124 is in a range of about 0.25 to 0.5. In various embodiments, for the payload 122 and the counterweight 126 to be at opposite sides of the elevated lateral pole-like structure 150, or more particularly, for a ratio of a length of a portion of the tether 124 from the second end portion to a point of contact with the elevated lateral pole-like structure 150 to the entire operating length of the tether 124 is in a range of about 0.25 to 0.5 when the tether 124 reaches and contacts with the elevated lateral pole-like structure 150, the point of actuating the payload release system, or the position of the aerial vehicle 102 or the tethered payload system 120, to release the tethered payload system 120 may be determined based on a number of factors, such as but not limited to, the difference in height (e.g., estimation thereof) between the elevated lateral pole-like structure 150 and the tethered payload system 120, a velocity or momentum (e.g., estimation thereof) of the aerial vehicle 102 carrying the tethered payload system 120, an ejection strength of the launcher for ejecting the counterweight 126 from the chamber (and hence, a projection distance of the counterweight 126) and/or the operating length of the tether 124. Accordingly, for example, in the case of that the counterweight 126 is to be ejected in a direction of travel of the aerial vehicle 102, the aerial vehicle 102 or the tethered payload system 120 held by the aerial vehicle 102 may be above and at an appropriate distance before the elevated lateral pole-like structure 150 when the payload release system is actuated to release the tethered payload system 120. On the other hand, for example, in the case of that the counterweight 126 is to be ejected in a direction opposite to a direction of travel of the aerial vehicle 102, the aerial vehicle 102 or the tethered payload system 120 held by the aerial vehicle 102 may be above and at an appropriate distance after the elevated lateral pole-like structure 150 when the payload release system is actuated to release the tethered payload system 120.

Figure 3:
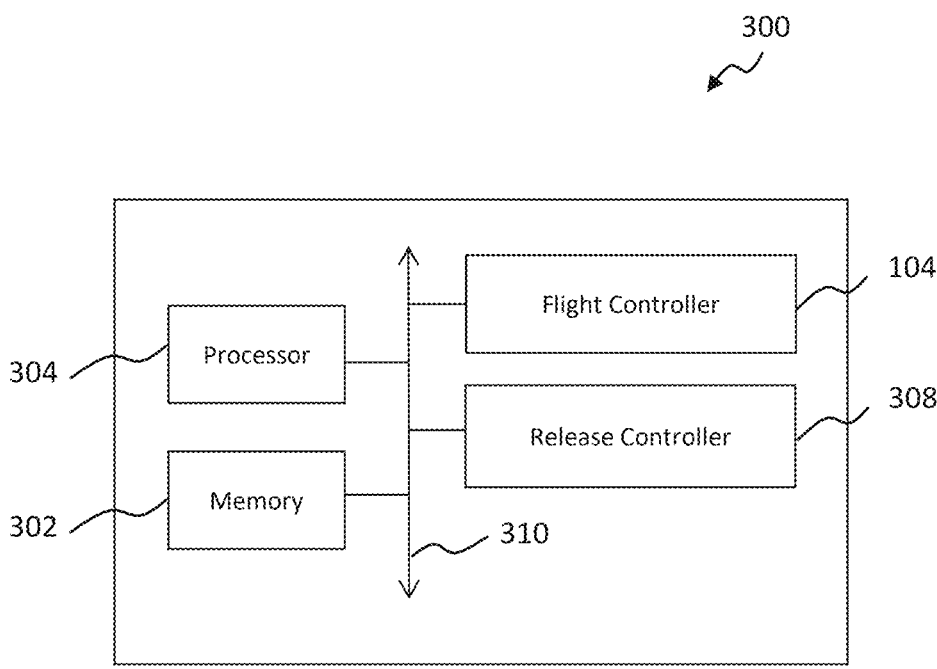
FIG. 3 depicts a schematic block diagram of a controller system comprising a flight controller and a release controller, according to various embodiments of the present invention.

FIG. 3 depicts a schematic block diagram of a controller system 300 comprising the above-mentioned flight controller 104 (or a flight control module or circuit) and the above-mentioned release controller 308 (or a release control module or circuit) according to various embodiments of the present invention. The controller system 300 comprises: at least one memory 302; and at least one processor 304 communicatively coupled to the at least one memory 302 and configured to perform or implement the above-mentioned method 200 of operating the aerial payload deployment system 100 as described hereinbefore with reference to FIG. 2 according to various embodiments of the present invention.

It will be appreciated by a person skilled in the art that the at least one processor 304 may be configured to perform various functions or operations through set(s) of instructions (e.g., software modules) executable by the at least one processor 304 to perform various functions or operations. Accordingly, as shown in FIG. 3, the flight controller 104 may be configured to control a flight of the aerial vehicle based on a flight navigation command signal (e.g., either from a user input or generated automatically based on sensor data and a target position (e.g., target release position)) for navigating the aerial vehicle 102 to a position (e.g., a target position) above an elevated lateral pole-like structure 150 for deploying a payload 122 to the elevated lateral pole-like structure 150. The release controller 308 may be configured to actuate or trigger (e.g., either from a user input or generated automatically based on sensor data and a target position (e.g. when determined based on sensor data that the aerial vehicle 102 or the tethered payload system 120 held by the aerial vehicle 102 has reached the target release position)) the payload release system (or more particular, the first and second actuatable release mechanisms) to release the tethered payload system 120. It will be appreciated by a person skilled in the art that the flight controller 104 and/or the release controller 308 may communicate with the at least one processor 304, the at least one memory 302 and various components of the aerial payload deployment system 100 as appropriate via one or more interconnected bus 310.

It will be appreciated by a person skilled in the art that the flight controller 104 and the release controller 308 are not necessarily separate modules, and they may be realized by or implemented as one functional module (e.g., a circuit or a software program) as desired or as appropriate without deviating from the scope of the present invention. For example, the flight controller 104 and the release controller 308 may be realized (e.g., compiled together) as one executable software program (e.g., software application or simply referred to as an "app"), which for example may be stored in the at least one memory 302 and executable by the at least one processor 304 to perform various functions/operations as described herein according to various embodiments of the present invention.

In various embodiments, the controller system 300 corresponds to the method 200 of operating the aerial payload deployment system 100 as described hereinbefore with reference to FIG. 2 according to various embodiments, therefore, various functions or operations configured to be performed by the least one processor 304 may correspond to various functions or operations of the method 200 of operating the aerial payload deployment system 100 as described hereinbefore according to various embodiments, and thus need not be repeated with respect to the controller system 300 for clarity and conciseness. In other words, various embodiments described herein in context of the methods are analogously valid for the corresponding systems or devices, and vice versa. For example, in various embodiments, the at least one memory 302 may have stored therein the flight controller 104 and/or the release controller 308, which respectively correspond to various functions or operations of the method 200 of operating the aerial payload deployment system 100 as described herein according to various embodiments, which are executable by the at least one processor 304 to perform the corresponding functions or operations as described herein.

Any computing system or device providing a processing capability may be provided according to various embodiments of the present invention. Such a computing system or device may be taken to include one or more processors and one or more computer-readable storage mediums. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions may also be understood as a "circuit" in accordance with various embodiments. Similarly, a "module" may be a portion of a system according to various embodiments and may encompass a "circuit" as described above, or may be understood to be any kind of a logic-implementing entity.

Some portions of the present disclosure may be explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

In addition, the present specification also at least implicitly discloses a computer program or software/functional module, in that it would be apparent to the person skilled in the art that various functions or operations of various methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the scope of the invention. It will be appreciated by a person skilled in the art that various modules described herein (e.g., the flight controller 104 and/or the release controller 308) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

A computer program may be stored on any computer readable medium. The computer readable medium may include storage devices such as magnetic or optical disks, memory chips, or other storage devices suitable for interfacing with a computer. The computer program when loaded and executed on such the computer effectively results in a system or an apparatus that implements various functions or operations of methods described herein.

In various embodiments, there is provided a computer program product, embodied in one or more computer-readable storage mediums (non-transitory computer-readable storage medium(s)), comprising instructions (e.g., the flight controller 104 and/or the release controller 308) executable by one or more computer processors to perform the method 200 of operating the aerial payload deployment system 100, as described herein with reference to FIG. 2 according to various embodiments. Accordingly, various computer programs or modules described herein may be stored in a computer program product receivable by, or transferrable to, a system or device, such as the controller system 300 for execution by at least one processor 304 to perform various functions or operations.

Software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

Figure 4:
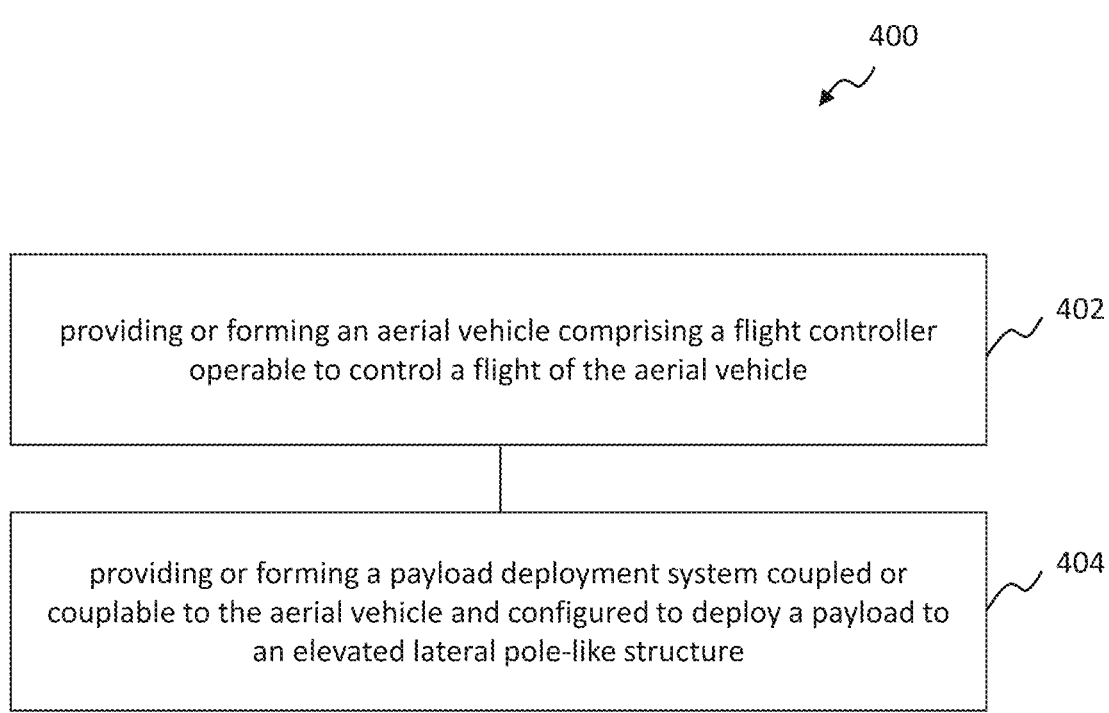
FIG. 4 depicts a schematic flow diagram of a method of forming an aerial payload deployment system, according to various embodiments of the present invention.

FIG. 4 depicts a schematic flow diagram of a method 400 of forming an aerial payload deployment system (e.g., the aerial payload deployment system 100 as described hereinbefore according to various embodiments the present invention), according to various embodiments of the present invention. The method 400 comprising: providing or forming (at 402) an aerial vehicle 102 comprising a flight controller 104 operable to control a flight of the aerial vehicle 102; and providing or forming (at 404) a payload deployment system 110 coupled or couplable to the aerial vehicle 102 and configured to deploy a payload 122 to an elevated lateral pole-like structure 150. In particular, the payload deployment system 110 comprises: a tethered payload system 120 comprising: a tether 124 having a first end portion and a second end portion; and a counterweight 126 coupled to the first end portion of the tether 114, the second end portion of the tether 124 being coupled or couplable to the payload 122 to be deployed; and a payload release system configured to releasably secure the tethered payload system 120 and is actuatable to release the tethered payload system 120 in a manner such that when the tethered payload system 120 descends towards the elevated lateral pole-like structure 150 after being released for the elevated lateral pole-like structure 150, the counterweight 126 is spaced laterally apart from the payload 122, and the payload 122 and the counterweight 126 are at opposite sides of the elevated lateral pole-like structure 150 when the tether 124 reaches and contacts with the elevated lateral pole-like structure 150.

In various embodiments, the method 400 is for forming the aerial payload deployment system 100 as described hereinbefore according to various embodiments with reference to FIG. 1, therefore, various steps or operations of the method 400 may correspond to forming, providing or configuring various components or portions of the aerial payload deployment system 100 as described hereinbefore according to various embodiments, and thus such corresponding steps or operations need not be repeated with respect to the method 400 for clarity and conciseness. In other words, various embodiments described herein in context of the aerial payload deployment system 100 are analogously valid for the method 400 (e.g., for forming the aerial payload deployment system 100 having various components, portions and configurations as described hereinbefore according to various embodiments), and vice versa.

In various embodiments, the payload deployment system 110 may be integrally coupled to (i.e., integrally formed with) the aerial vehicle 102 or may be formed separately and then physically coupled (e.g., releasably/detachably coupled) to the aerial vehicle 102 to form the aerial payload deployment system 100. In various embodiments, the tethered payload system 120 may be formed and then loaded in or secured to the payload deployment system 110 via the payload release system such that the payload release system may be actuated to release or deploy the tethered payload system 120.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any reference to an element or a feature herein using a designation such as "first", "second" and so forth does not limit the quantity or order of such elements or features, unless stated or the context requires otherwise. For example, such designations may be used herein as a convenient way of distinguishing between two or more elements or instances of an element. Thus, a reference to first and second elements does not necessarily mean that only two elements can be employed, or that the first element must precede the second element. In addition, a phrase referring to "at least one of" a list of items refers to any single item therein or any combination of two or more items therein.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

According to various example embodiments of the present invention, there is provided an aerial payload deployment system for deploying or attaching a payload to a pole-like structure (elevated lateral pole-like structure), comprising a tethered payload system which may be herein referred to as a GRavity ASsisted Payload EntangleR (GRASPER). In particular, as described in the background, to seek to overcome, or at least ameliorate, one or more deficiencies in conventional aerial payload deployment systems such as driven by SWaP (size, weight and power) constraints imposed on aerial platforms, various example embodiments provide an aerial payload deployment system which enables a fundamentally different way of deploying a payload, and more particularly, to a pole-like structure for various practical applications, such as for load transportation and attachment tasks, for example, compared to various conventional aerial payload deployment systems (e.g., using an arm-based aerial manipulator/gripper requiring a large platform) as described in the background of the present invention.

In various example embodiments, a tethered payload system is provided which comprises two bodies, namely, a counterweight and a payload that are released onto a pole-like structure at height. Being a passive attachment system, the tethered payload system is advantageously lightweight, simple to use, surprisingly robust and operates (i.e., payload deployed) remotely at a distance from the target structure, which is advantageous for aerial vehicle (e.g., rotorcraft) endurance and safety. To evaluate the aerial payload deployment system, various example embodiments define a model to account for the influence of gravity, rotational dynamics and the Capstan effect on a two-body system (corresponding to the above-mentioned tethered payload system) released from rest. The time-evolution of the two-body system is simulated numerically, and then compared against real-world experiments across variables such as mass, string length and counterweight types. A number of design factors for the aerial payload deployment system are then derived thereafter according to various example embodiments of the present invention. To demonstrate the efficiency and effectiveness of the aerial payload deployment system according to various example embodiments, as will be described later below, the aerial payload deployment system is implemented with an aerial aircraft in the form of a rotorcraft (e.g., a quadrotor) as an illustrative non-limiting example for aerial payload deployment applications using UAVs.

As described in the background, load transportation and manipulation remain an active field of research in aerial robotics, given the constraints on size, weight and power (SWaP) placed on flight platforms. Arm-based unmanned aerial manipulators (UAMs) are straightforward ways of adding manipulation capabilities, but necessitate large platforms to accommodate multiple actuators. Other works have proposed reusing a combination of existing on-board systems (e.g., propulsion, structure) to reduce actuation requirements and increase structural efficiency to accomplish manipulation tasks. However, such conventional systems are ill-suited for attaching heavier objects to pole-like structures, owing to unstable dynamics, large torque requirements for overcoming gravity and disabling of flight functions. Additionally, quadrotor performance can vary significantly near objects such as the ground or walls. Furthermore, certain UAMs are dependent on accurate localisation systems for manipulator control, further constraining their context of operation.

Various example embodiments note that there are many opportunities for UAMs to interact with pole-like structures (elevated lateral pole-like structures) in various environments (e.g., urban environments). In this regard, the aerial payload deployment system according to various example embodiments is advantageously configured for transportation and attachment of a payload to a pole-like structure remotely (i.e., the payload is deployed remotely at a distance from a target pole-like structure instead of requiring the payload deployment to occur nearby or directly at (e.g., in contact with) the target structure or location). For example, various example embodiments note that objects such as lamp posts, traffic light poles, tree branches and scaffolding are common in urban settings, yet they pose a danger to nearby UAV (e.g., rotorcraft).

Accordingly, various example embodiments provide an aerial payload deployment system that seeks to overcome, or at least ameliorate, one or more deficiencies in conventional aerial payload deployment systems, and more particularly, that enables a different way and/or an efficient and effective way of deploying a payload. In particular, various example embodiments provide an aerial payload deployment system comprising a tethered payload system (e.g., a tether-based passive grappler) configured for deploying a payload to a pole-like structure (i.e., an elevated lateral pole-like structure). In this regard, the tethered payload system advantageously converts gravitational potential energy into rotational kinetic energy to entangle a payload onto a pole-like structure, and thus securing the payload to the pole-like structure. This can be efficiently and effectively achieved by releasing the tethered payload system remotely from and above the pole-like structure. Accordingly, the aerial payload deployment system according to various example embodiments is advantageous over conventional aerial payload deployment systems, such as the UAMs as described in the background of the present invention, for example, its simplicity, robustness of capture and payload capacity. For example, the release mechanisms of the aerial payload deployment system according to various example embodiments may only require two small release mechanisms (e.g., two payload release servos, one for releasably securing the payload and the other one for releasably securing the counterweight) which keeps the aerial payload deployment system simple and light. Furthermore, the aerial payload deployment system is capable of securing a heavy payload at minimal cost weight-wise, demonstrating successful payload capture with a counterweight up to $1/12$ the mass of the payload, while also working safely at distances upwards of 1 m (in height). To demonstrate the flexibility and effectiveness of the aerial payload deployment system according to various example embodiments of the present invention, as will be described later below, the aerial payload deployment system was demonstrated to work or operate effectively across a wide range of initial conditions and/or parameters.

Accordingly, the aerial payload deployment system according to various example embodiments may exploit pendulum-related effects for payload deployment. In this regard, various example embodiments may provide a pendulum catch based on the Euler-Eytelwein or Capstan equation, which mathematically describes the relationship between the maximum allowable load force of a rope wrapped around a cylinder for a given holding force. Therefore, according to various example embodiments, a simple kinodynamic model is created to study or evaluate the trajectory of the pendulum catch posed as a problem of payload deployment onto an elevated lateral pole-like structure, such as an overhanging portion of a lamp post. As will be described later below, the feasibility of the aerial payload deployment system according to various example embodiments is demonstrated across a wide range of initial conditions and/or parameters, the experimental results of which are compared against the above-mentioned kinodynamic model as a reference. Various example embodiments also show how the addition of a magnet to the counterweight (or forming the counterweight to be magnetic) greatly improves deployment or capture success rates.

Pendulum Catch Modelling
Pendulum Catch Description

Figure 5:
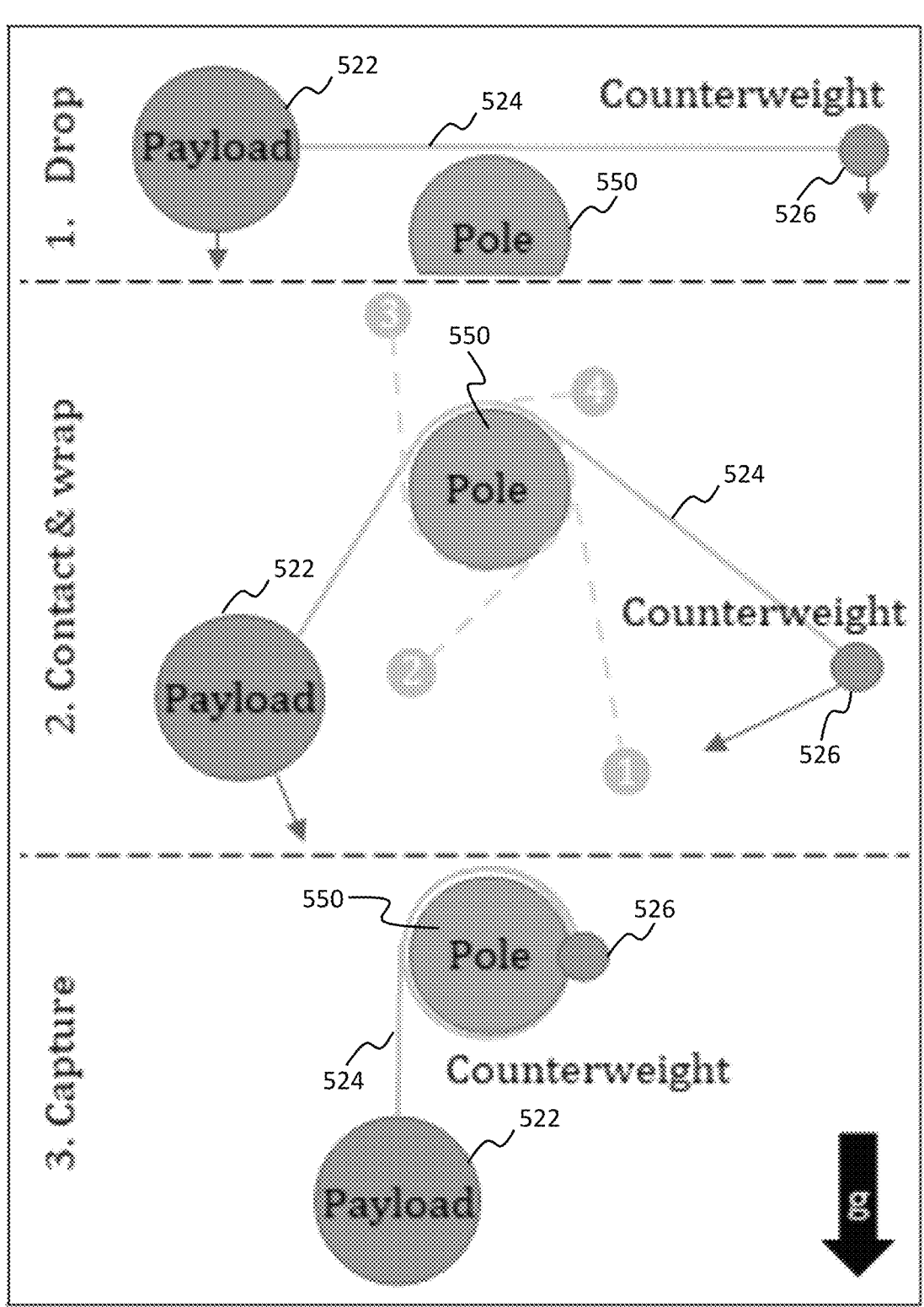
FIG. 5 depicts three example stages of deploying a tethered payload system and securing/attaching the payload to a pole, according to various example embodiments of the present invention.

According to various example embodiments, in its basic form, a pendulum catch comprises two bodies, namely, a heavier pendulum (corresponding to a payload) 522 and a lighter counterweight 526 connected together via a tether 524 such as depicted in FIG. 5. In particular, FIG. 5 depicts three example stages of deploying a tethered payload system and securing/attaching the payload 522 to a pole (or pole-like structure) 550. It will be appreciated by a person skilled in the art that the tethered payload system shown in FIG. 5 is not drawn to scale and that the tether 524 is shown deliberately short for clarity and ease of illustrating. FIG. 5 shows an example drop stage of the tether 524 dropping and reaching the pole 550 after being deployed or released for the pole 550. FIG. 5 also shows an example contact and wrap stage of the tether 524 contacting the pole 550 and then begin wrapping around the pole 550. In this regard, the tether 524 becomes taut on contact with the pole 550, thereby causing the payload 522 to tug on the counterweight 526. This interplay of tension and gravity causes the counterweight 526 to begin wrapping around the pole 550, while the payload 522 further descends due to its larger mass. A combination of continued wrapping by the counterweight 526 and tension then takes effect, slowing and eventually halting the descent of both bodies (i.e., the payload 522 and the counterweight 526) courtesy of the Capstan effect. Finally, as shown in an example capture stage, the counterweight 526 completes its wrapping and terminates in a collision or an engagement with the pole 550, resulting in the stable capture of both bodies. In various example embodiments, the capture stage may be assisted by magnetic adhesion. In this regard, the counterweight 526 may be magnetic for facilitating engagement with the pole 550 for securing the payload 522 to the pole 550.

Accordingly, as shown in FIG. 5, the tethered payload system may be released in a manner such that when the tethered payload system descends towards the pole 550 after being released for the pole 550, the counterweight 526 is spaced laterally apart from the payload 522, and the payload 522 and the counterweight 526 are at opposite sides of the pole 550 when the tether 524 reaches and contacts with the pole 550. Furthermore, the tethered payload system is configured such that, after the tether 524 reaches and contacts with the pole 550, the counterweight 526 rotates about the pole 550 thereby causing a portion of the tether 524 up to the end portion coupled to the counterweight 526 to wrap around the pole 550 until the counterweight 526 engages therewith and thereby securing the payload 522 to the pole 550.

Model Assumptions

In various example embodiments, the kinodynamic model for the pendulum catch makes the following simplifying assumptions:

a perfectly inelastic string that does not deform, ignoring stretching and spring-related effects;

the pole-like structure is reduced to a single point of zero radius, ignoring the effects of geometry on friction and length loss from wrapping; and the payload and counterweight are treated as point masses, removing rotation-induced effects along the string axis.

As will be demonstrated later below according to various example embodiments, despite these simplifications, the kinodynamic model retains satisfactory accuracy in re-tracing the trajectory of the two bodies (i.e., the payload 522 and the counterweight 526).

Coordinate System & Free-Body Diagram

Figures 6, 7:
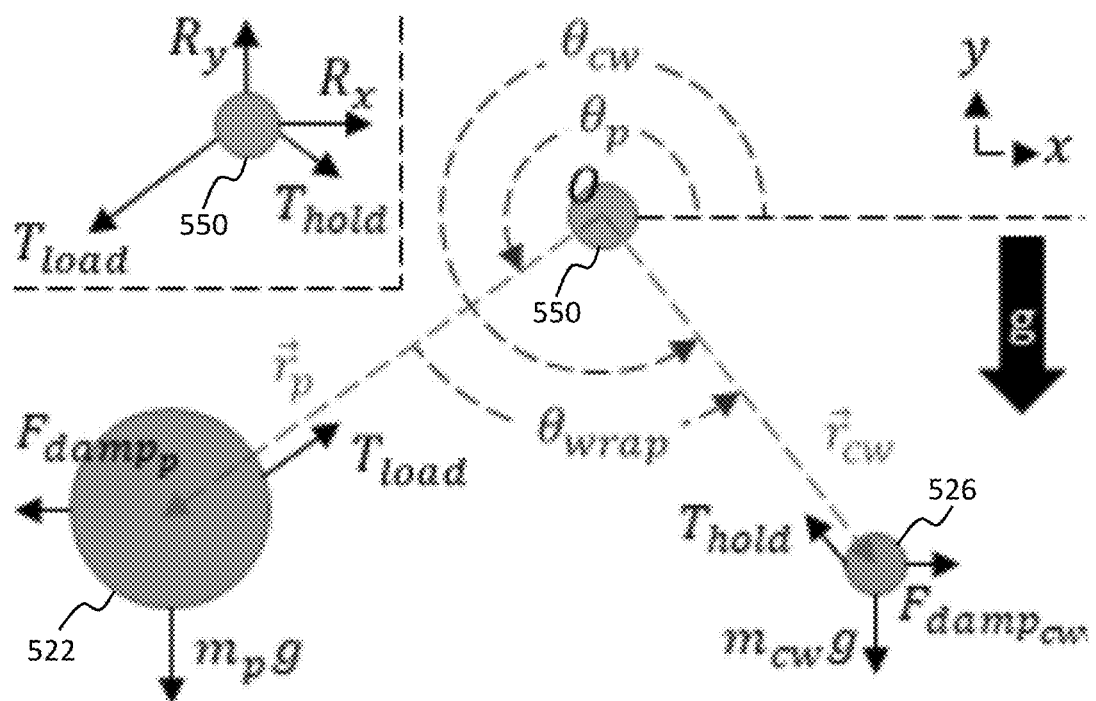
FIG. 6 depicts a schematic drawing of a free-body diagram of the pendulum catch in a polar coordinate system, according to various example embodiments of the present invention.
FIG. 7 shows a table (Table I) including example system parameters (simulation constants and variables) for various simulations performed, according to various example embodiments of the present invention.

In various example embodiments, the space is restricted to $\Re^2$ using a polar coordinate system ($\vec{r}$, $\vec{\theta}$), with $\vec{r}_p$, $\vec{r}_c$ representing displacement of the payload 522 and counter-weight 526, respectively, from an origin in meters (m), and $\vec{\theta}_p$, $\vec{\theta}_c$ representing angular displacement, respectively, in radians (rad). FIG. 6 depicts a schematic drawing of a free-body diagram of the pendulum catch in the polar coordinate system, according to various example embodiments of the present invention.

Model Equations

According to various example embodiments, the acceleration on each body may be described by Newtonian mechanics, by taking the time derivative of its velocity:

$$\ddot{\vec{r}} = \frac{d}{dt}\left(\dot{r}\vec{e}_r + r\dot{\theta}\vec{e}_\theta\right)\left(\ddot{r} - r\dot{\theta}^2\right)\vec{e}_r + \left(\ddot{\theta} + 2\dot{r}\dot{\theta}\vec{e}_\theta\right) \quad \text{(Equation 1)}$$

where $\vec{e}_r$, $\vec{e}_\theta$ are the basis vectors for the radial and angular axes.

It can be noted that Equation (1) already contains the decomposition of the acceleration components about each axis. Various example embodiments then introduce the Cap-stan-Eytelwein equation, which relates the wrap angle $\theta$ and supply holding tension from the counterweight 526 to the maximum possible loading force on the payload 522, where $\mu$ is the friction coefficient and $\theta_{wrap}$ is the wrap angle between the payload 522 and counterweight 526.

$$T_{load} = T_{hold}\exp(\mu, \theta_{wrap}) \quad \text{(Equation 2)}$$

For example, Equation (2) showcases how the Capstan effect acts as a force amplifier, where the maximum holding force increases exponentially with the wrapping angle. In addition to the above equations, various example embodiments also place kinodynamic constraints on the tethered payload system as follows:

20

$$r_{total} = r_p + r_c \quad \text{(Equation 3)}$$

$$\dot{r}_p = -\dot{r}_c \quad \text{(Equation 4)}$$

$$|T_{pay}| \le |T_{cw}\exp(\mu, \theta_{wrap})| \quad \text{(Equation 5)}$$

Equations (3) and (4) encode string length conservation and inelasticity, and Equation (5) places an upper bound on friction provided by Capstan effects, ensuring that it only resists tension loads. Combining the above equations together, various example embodiments arrive at a series of coupled first order differential equations, where $m_p$, $m_{cw}$ are the masses of the payload 522 and the counterweight 526, respectively, in kilograms (kg):

$$\frac{d}{dt}r_p = \dot{r}_p \quad \text{(Equation 6)}$$

$$\frac{d}{dt}\dot{r}_p = g\cos\left(\frac{3\pi}{2} - \theta_p\right) + r_p\dot{\theta}_p^2 - \frac{T_{hold}}{m_p} \quad \text{(Equation 7)}$$

$$\frac{d}{dt}\theta_p = \dot{\theta}_p \quad \text{(Equation 8)}$$

$$\frac{d}{dt}\dot{\theta}_p = g\sin\left(\frac{3\pi}{2} - \theta_p\right) - 2\frac{\dot{r}_p\dot{\theta}_p}{r_p} - c\dot{\theta}_p \quad \text{(Equation 9)}$$

$$\frac{d}{dt}r_{cw} = -\dot{r}_p \quad \text{(Equation 10)}$$

$$\frac{d}{dt}\dot{r}_{cw} = -\frac{d}{dt}\dot{r}_p \quad \text{(Equation 11)}$$

$$\frac{d}{dt}\theta_{cw} = \dot{\theta}_{cw} \quad \text{(Equation 12)}$$

$$\frac{d}{dy}\dot{\theta}_{cw} = g\sin\left(\frac{3\pi}{2} - \theta_{cw}\right) - 2\frac{\dot{r}_{cw}\dot{\theta}_{cw}}{r_{cw}} - c\dot{\theta}_{cw} \quad \text{(Equation 13)}$$

Since string tension supplies radial acceleration of the bodies, various example embodiments use Equation (1) to derive the unknowns $T_{hold}$ of the counterweight 526 and $T_{load}$ from the payload 522 as follows:

$$T_{hold} = m_{cw}g\left(\cos\left(\frac{3\pi}{2} - \theta_{cw}\right) + r_{cw}\dot{\theta}_{cw}^2\right)\exp(\mu, \theta_{wrap}) \quad \text{(Equation 14)}$$

$$T_{load} = m_pg\left(\cos\left(\frac{3\pi}{2} - \theta_p\right) + r_p\dot{\theta}_p^2\right) \quad \text{(Equation 15)}$$

For example, Equations (6) to (13) may be treated as an initial value problem, with solutions obtained via a numeri-cal solver.

From Equation (5), $|T_{pay}|$ is conditionally defined to differentiate between slipping and stick condition using the radial velocity of the payload 522 (e.g., $\dot{r}_p$) assuming line tautness, where:

$$|T_{pay}| = \begin{cases} |T_{cw}\exp(\mu, \theta_{wrap})|, & \text{if } |\dot{r}_p| > v_{threshold} \\ |T_{load}|, & \text{if } |\dot{r}_p| \le v_{threshold} \end{cases} \quad \text{(Equation 16)}$$

In addition, various example embodiments model the effects of using a magnetic counterweight by evaluating the radial displacement. In this regard, the magnet is assumed to be able to supply sufficient holding force, due to the Capstan equation's exponential force multiplication.

$$r_p = \begin{cases} 0, & \text{if } r_p < r_{pole} \\ \dot{r}_p, & \text{if } r_p \geq r_{pole} \end{cases}$$ (Equation 17)

Simulation

In various simulations performed, the time-evolution of the tethered payload system according to various example embodiments was computed using ode45 in MATLAB. For example, the initial values of the tethered payload system comprises both radial and angular displacements as well as velocities, which may be represented by a row vector $[r_{p_i}, \dot{r}_{p_i}, \theta_{p_i}, \dot{\theta}_{p_i}, r_{cw_i}, \dot{r}_{cw_i}, \theta_{cw_i}, \dot{\theta}_{cw_i}]$. The initial velocities are taken to be 0, unless stated otherwise. Alongside the initial values are constant system parameters such as tether/string length $r_{total}$ (operating length), the mass of the payload 522 and counterweight 526 $m_p$, $m_{cw}$, the friction coefficient $\mu$, the angular offsets for gravity $$a, b = \frac{3\pi}{w}$$

and the damping coefficient c. Example system parameters (simulation constants and variables) for various simulations performed according to various example embodiments are shown in Table I in FIG. 7.

Figure 8:
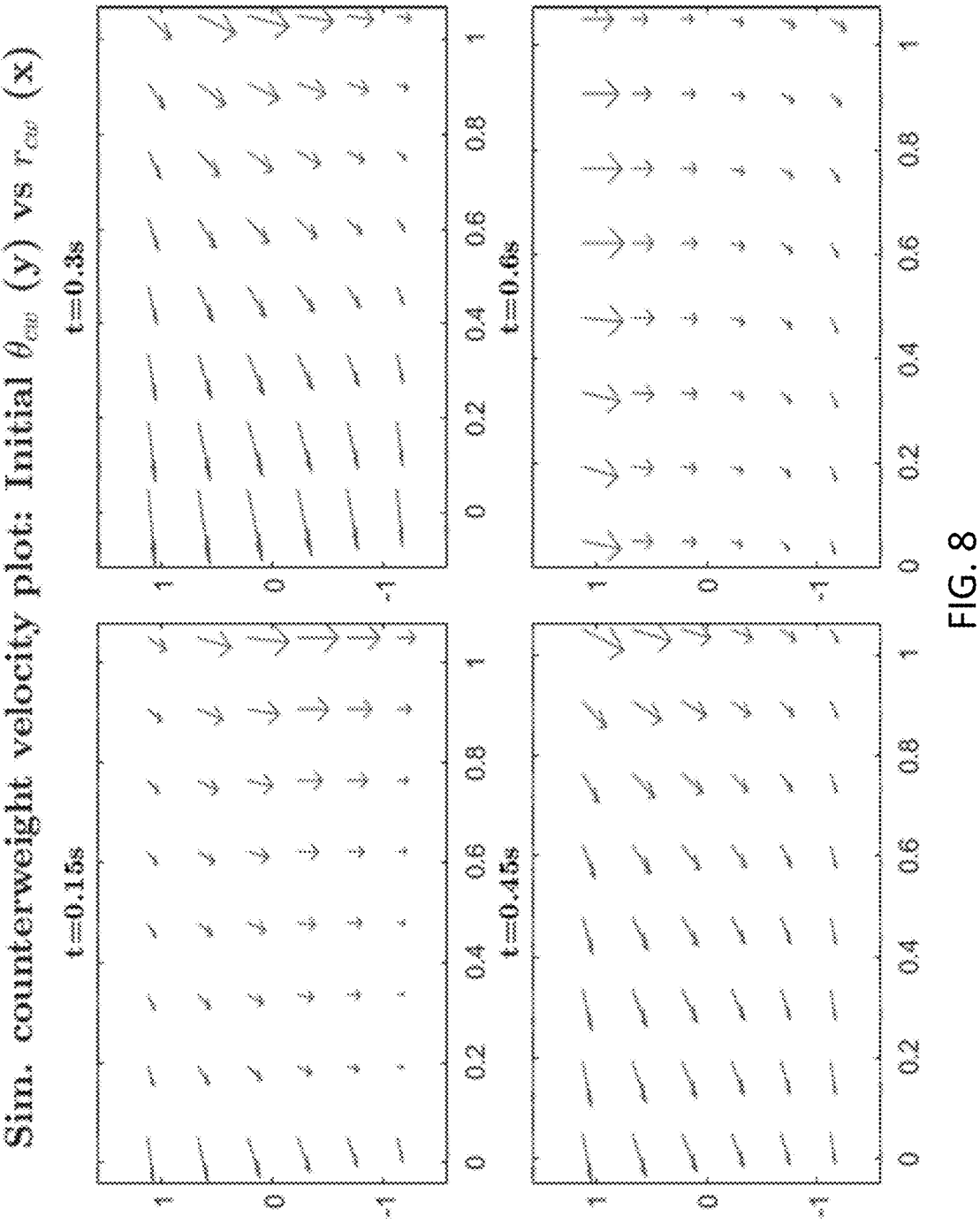
FIG. 8 depicts simulated velocity plots of the counterweight at certain time instances, given initial radial displacement ($r_{cw}$, x-axis) and initial angular displacement ($\theta_{cw}$, y-axis), according to various example embodiments of the present invention.

FIG. 8 depicts simulated velocity plots of the counterweight 526 at certain time instances, given initial radial displacement ($r_{cw}$, x-axis) and initial angular displacement ($\theta_{cw}$, y-axis), according to various example embodiments of the present invention. In particular, FIG. 8 depicts four simulated velocity plots of the counterweight 526 at time instances t=0.15 s, 0.30 s, 0.45 s, 0.6 s, respectively, capturing the effect of initial positions $r_{cw}$ and $\theta_{cw}$ on counterweight wrapping, where vectors shown in the velocity plots represent the corresponding $\dot{r}_{cw}$ and $\dot{\theta}_{cw}$.

As can be seen in FIG. 8, initially at t=0.15 s, gravity causes the counterweight 526 to start rotating around the pole 550. Not much slippage of the tether 524 occurs, since both payload 522 and counterweight 526 begin from rest. At t=0.3 s and t=0.45 s, slipping and wrapping of the tether 524 occurs simultaneously, with the payload's descent driving the tethered payload system. The tethered payload system begins settling at t=0.6 s (evident from the mostly vertical vectors in the corresponding velocity plot in FIG. 8 which indicate little to no radial slippage). Accordingly, from the velocity plots in FIG. 8, the following observations/factors were derived according to various example embodiments of the present invention:

the initial angular displacement of the counterweight 526 may be important, with capture occurring earliest with when initial $\theta_{cw}$ is between 0 to 1.28 radians (about 73.5 degrees);

the initial radial displacement of the counterweight 526 may also be important, with distances between 0.6 to 1 m giving the highest angular velocities that afford the most wrapping on capture, consequently increasing the holding force of the tethered payload system on pole-like structures;

placing the counterweight 526 directly above or below the pole (e.g., lamp post) 550 does not create the conditions for wrapping, as indicated by the horizontal vectors at t=0.6 s; and for additional wrapping, it is preferable for the counterweight 526 to start higher, for example, since it results in a higher angular velocity as shown in the velocity plot at t=0.6 s.

Figure 9:
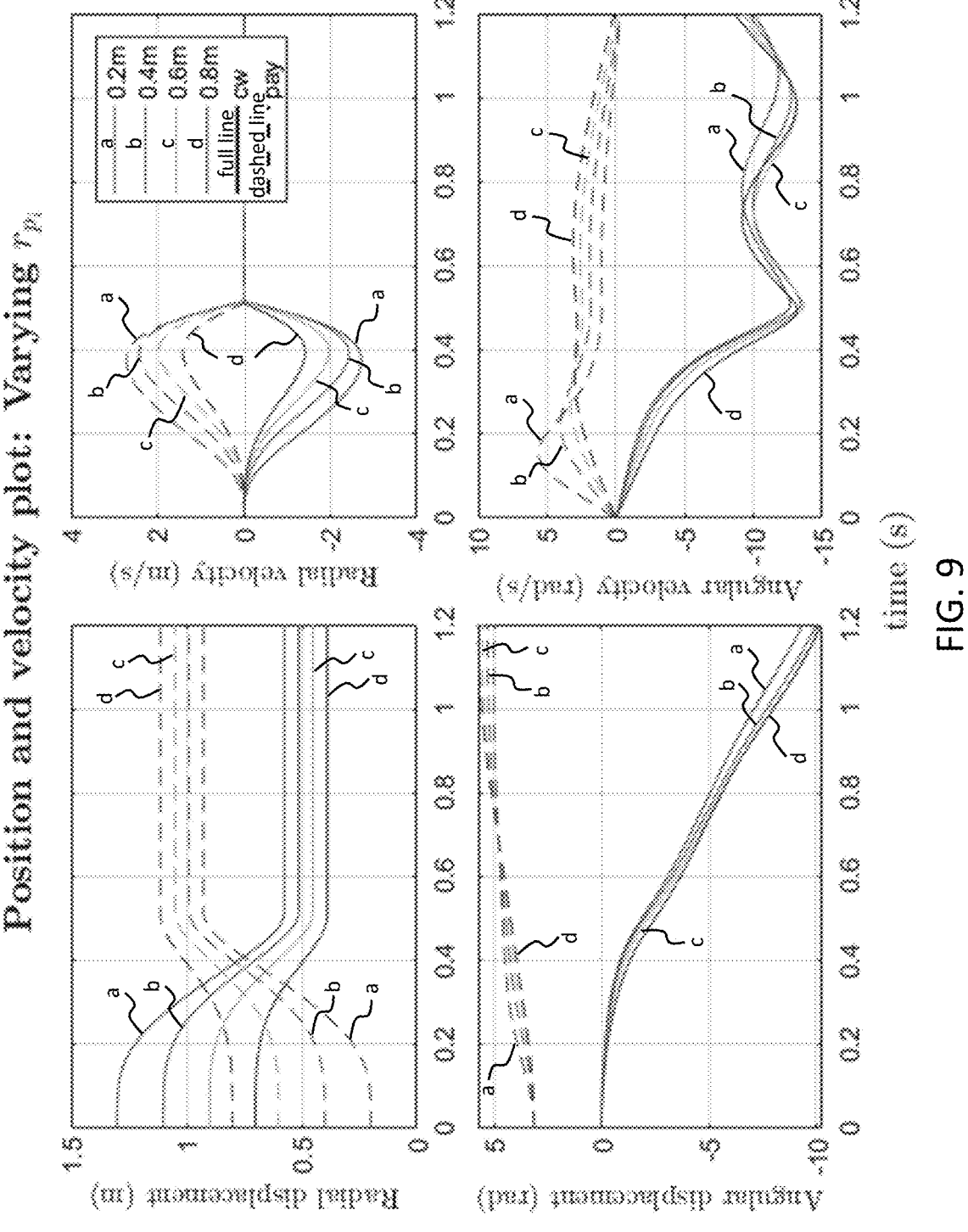
FIG. 9 depicts simulated position and velocity plots of the payload and the counterweight for 0.2 m≤$r_{p_i}$≤0.8 m, according to various example embodiments of the present invention.

Next, simulations were performed by setting $\theta_{p_i}=\pi$, $\theta_{cw_i}=0$, and the simulated position and velocity of the payload 522 and the counterweight 526 for payload offsets $r_{p_i}$ from 0.2 m to 0.8 m were plotted and shown in FIG. 9. Therefore, FIG. 9 depicts the simulated position and velocity plots of the payload 522 and the counterweight 526 for 0.2 m≤$r_{p_i}$≤0.8 m. In the context of a payload deployment system, understanding the effect of the payload offset $r_{p_i}$ on system behaviour facilitates the determination of feasible 'drop zones' according to various example embodiments of the present invention. For example, various example embodiments note an interesting correlation between the peak radial velocity and the payload offset, whereas angular velocities for both payload 522 and counterweight 526 remain similar across the board. These simulation results serve as the baseline comparison for the next two variables to be evaluated, namely, payload mass $m_p$ and tether length $r_{total}$.

Figure 10:
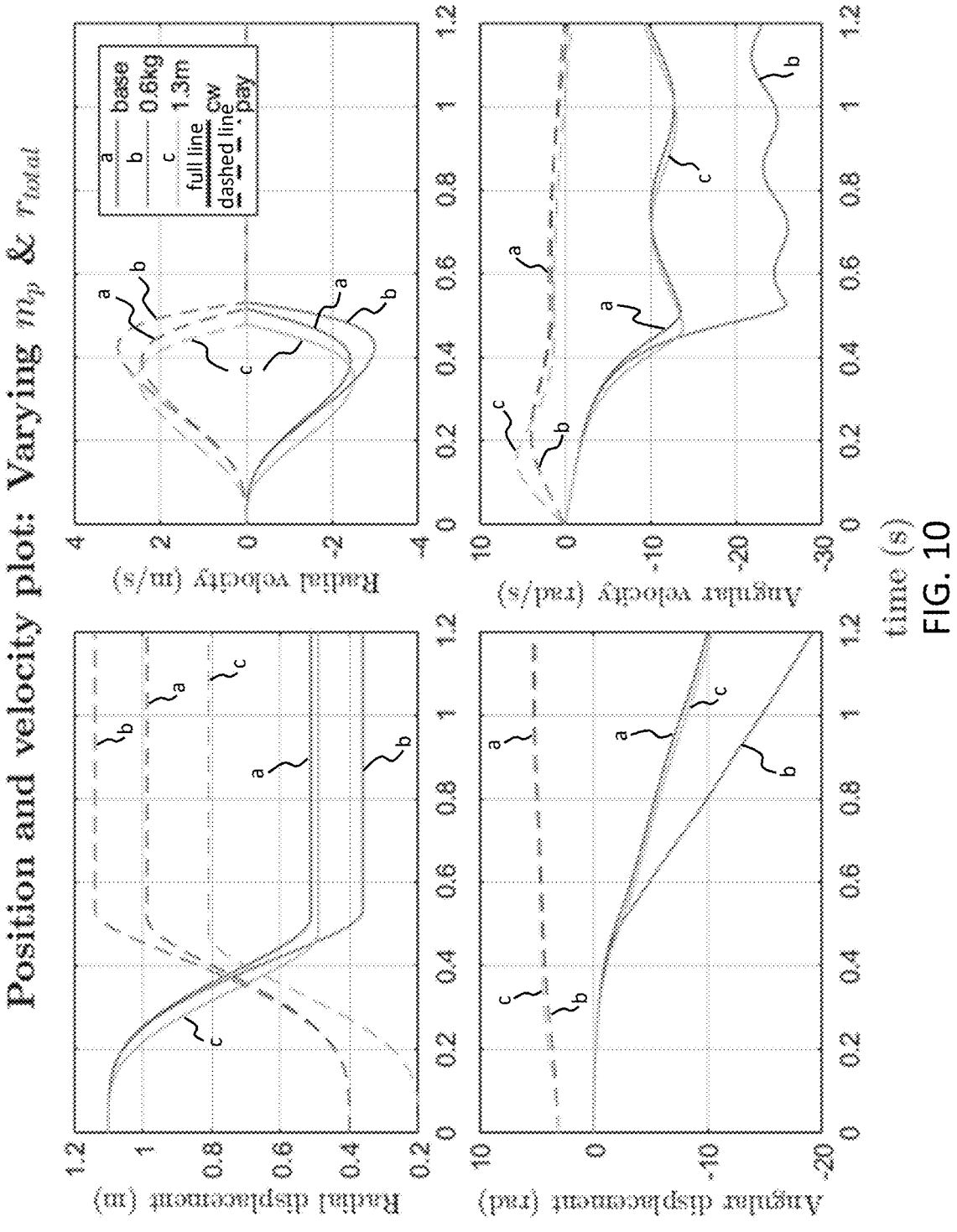
FIG. 10 depicts simulated position and velocity plots of the payload and the counterweight for varying payload mass $m_p$ and tether length $r_{total}$, according to various example embodiments of the present invention.

FIG. 10 depicts simulated position and velocity plots of the payload 522 and the counterweight 526 for varying payload mass $m_p$ and tether length $r_{total}$, according to various example embodiments of the present invention. In particular, FIG. 10 shows a comparison of the simulated position and velocity plots of the payload 522 and the counterweight 526 for the base plot (base simulation parameters, $r_{p_i}=0.4$ m) against tethered payload systems with increased payload mass $m_p$ (0.6 kg) and reduced tether length total (1.3 m). As can be seen from FIG. 10, an increase in payload mass translates to higher peak angular velocities $\dot{\theta}_{cw}$ for the counterweight 526 and slower payload capture $\dot{r}_p=0$ on account of the increased tension. Furthermore, a reduction in $r_{total}$ for a fixed $r_{cw}$ appears to reduce the time taken for capture.

Figure 11:
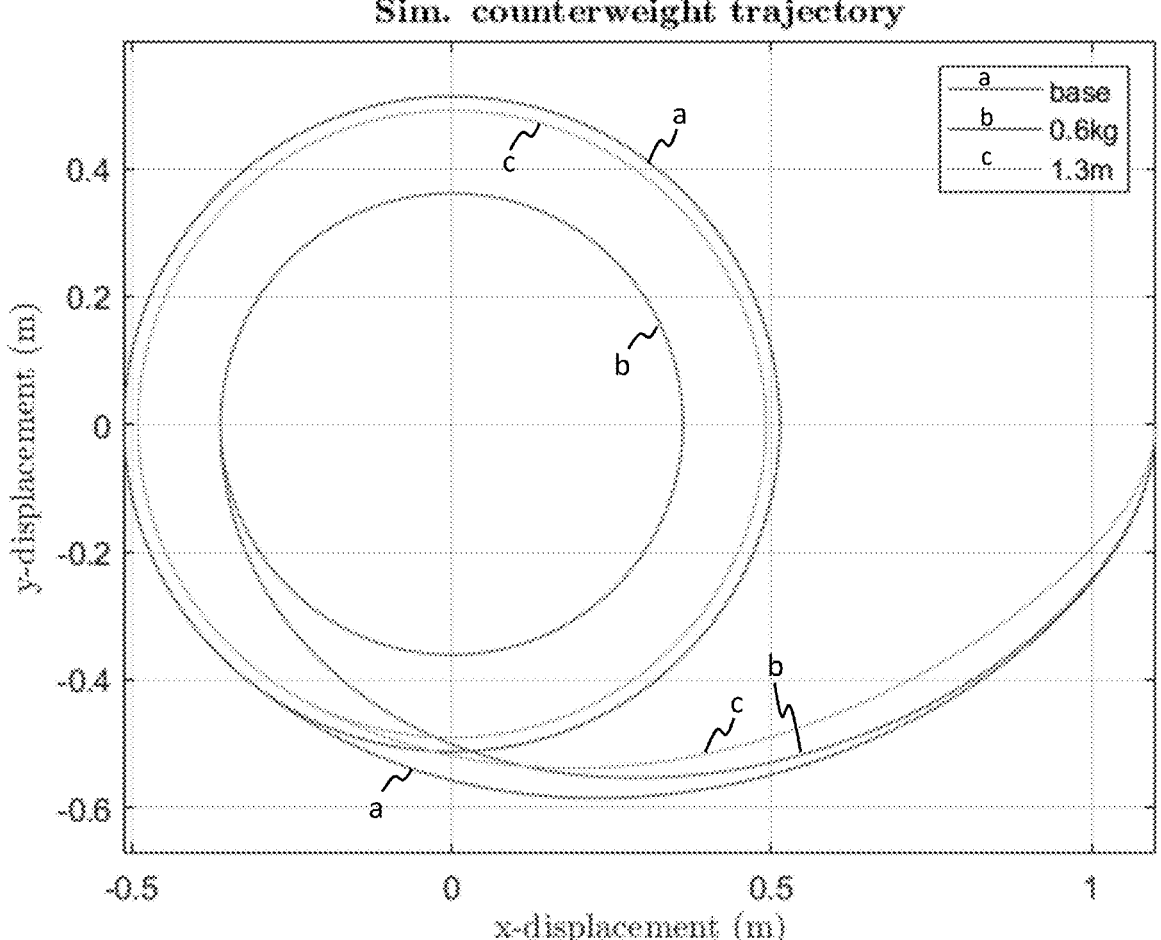
FIG. 11 depicts a simulated 2D plot visualising counterweight trajectory in terms of x-y displacement, using base simulation parameters ($r_{p_i}$=0.4 m) compared against systems with increased payload mass $m_p$ (0.6 kg) and reduced tether length $r_{total}$ (1.3 m), according to various example embodiments of the present invention.

FIG. 11 depicts a simulated 2D plot visualising counterweight trajectory in terms of x-y displacement, using base simulation parameters ($r_{p_i}=0.4$ m) compared against tethered payload systems with increased payload mass $m_p$ (0.6 kg) and reduced tether length $r_{total}$ (1.3 m). As can be observed from FIG. 11, the larger $m_p$ can be seen pulling the counterweight 526 into a tighter arc, which demonstrates that the extra tension translates into greater centripetal acceleration.

EXPERIMENTS

Experimental Setup

Figure 12:
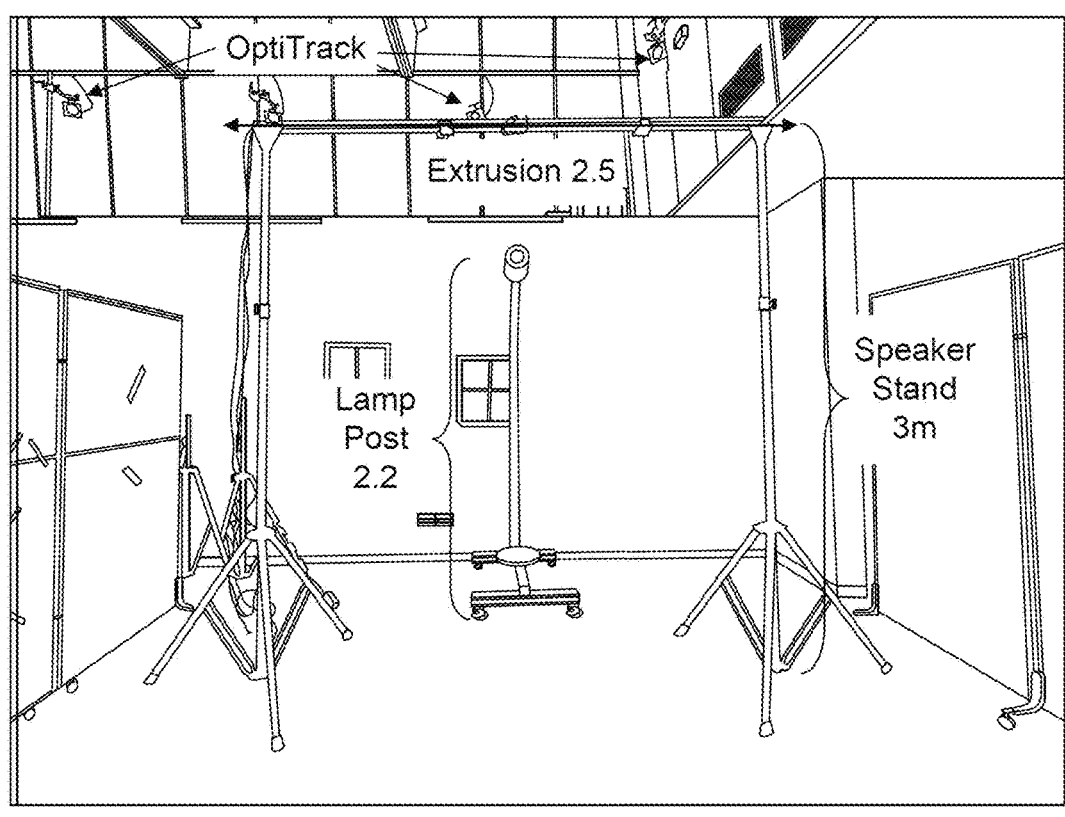
FIG. 12 shows a picture of an overview of the experimental setup, according to various example embodiments of the present invention.
Figure 13:
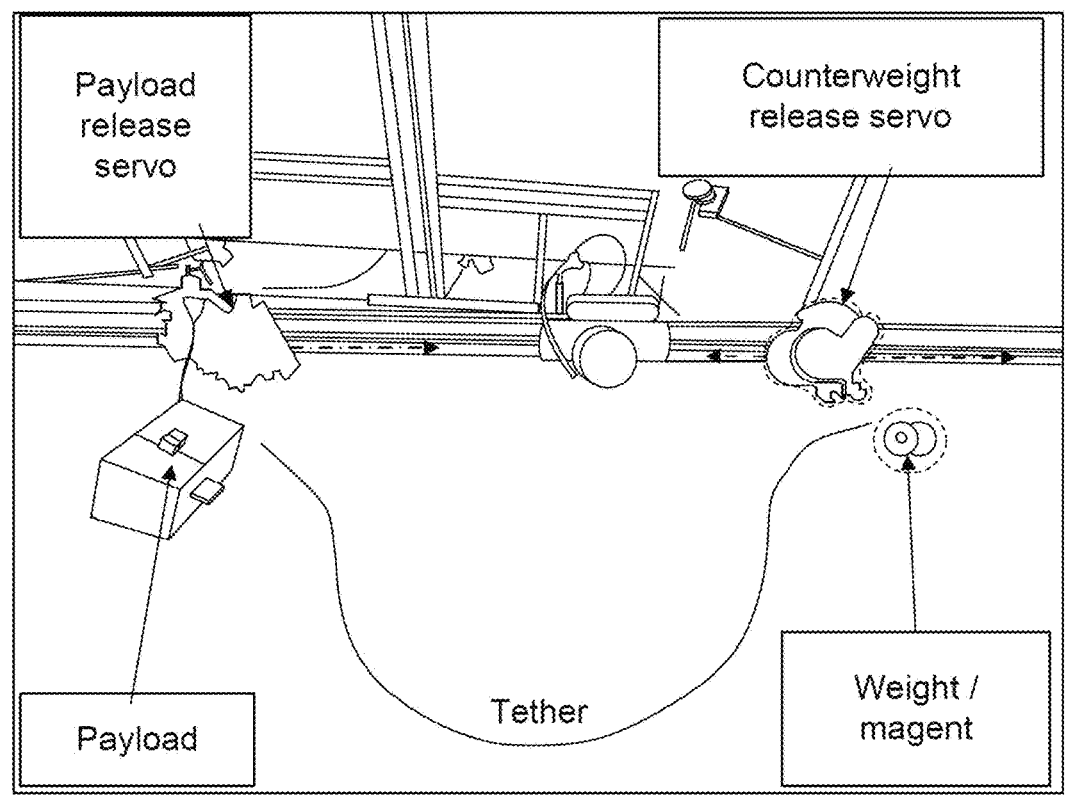
FIG. 13 shows a picture of a tethered payload system releasably secured to a payload release system, according to various example embodiments of the present invention.

Verification of the kinodynamic model according to various example embodiments was performed on a test-rig shown in FIGS. 12 and 13. In particular, FIG. 12 shows a picture of an overview of the experimental setup and FIG. 13 shows a picture of a tethered payload system releasably secured to a payload release system comprising a first actuatable release mechanism and a second actuatable release mechanism (e.g., a remotely-controlled release system comprising a payload release servo and a counterweight release servo). As can be seen in FIG. 12, the experimental setup comprises two height-adjustable speaker stands spanned by a 2.5 m elongated frame structure (aluminium frame structure). Mounted on the aluminium frame structure are two remotely-actuated digital release servos programmed for release within 10 ms of each other, with independently-adjustable mounts along the beam of the frame structure for setting the locations/positions of the payload and counterweight.

Figures 14, 15:
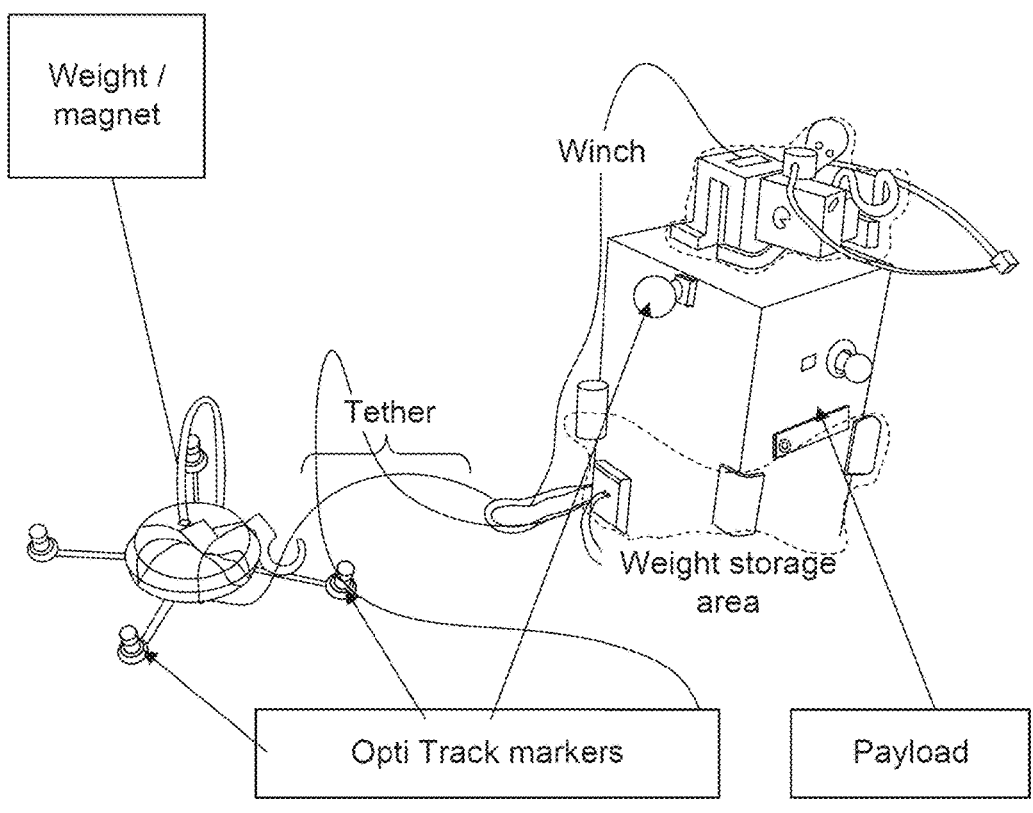
FIG. 14 shows a picture of the tethered payload system, according to various example embodiments of the present invention.
FIG. 15 shows a table (Table II) including a list and range of experimental variables tested in various experiments performed, according to various example embodiments of the present invention.

FIG. 14 shows a picture of the tethered payload system comprising a tether having a first end portion and a second end portion; and a counterweight coupled to the first end portion of the tether, the second end portion of the tether being coupled to the payload to be deployed.

In various experiments performed, the payload and the counterweight are released and dropped from the payload release servo and the counterweight release servo, respectively. For experimental purposes, the payload may include a receiver and a winch for controlling the operating length of the tether/string $r_{total}$, along with an internal cavity for housing or mounting various weights. The counterweight may be formed of a weight such as having a disc shape. For example, the counterweight may be non-magnetic or magnetic (e.g., N42-grade plastic-coated magnets). For obtaining experimental results, the counterweight and the payload have reflective markers placed thereon for enabling the tracking of the counterweight and the payload when in motion with respect to their position and orientation in space. In various experiments performed, the trajectories of the payload and the counterweight in space were tracked at 360 Hz via an OptiTrack motion-capture system. The tether connecting the payload and the counterweight is polyethylene monofilament line of 0.6 mm diameter, with a rated load capacity of 20 kg. It will be appreciated by a person skilled in the art that the tether is not limited to such a material and such a rated load capacity, and that a tether made of one or more different materials and/or having a different rated load capacity may be provided or implemented as desired or as appropriate depending on various factors.

In various experiments performed, the payload and counterweight were released onto a 2.2 m tall lamp post arm made of zinc-plated steel as shown in FIG. 12. The lamp post arm has a tapered octagonal cross-section measuring 0.05 m across and is made of a ferrous material. In this regard, in various experiments performed, the counterweight tested is magnetic.

Experimental Variables

In various experiments performed, masses of the payload and counterweight $m_p$, $m_{cw}$, string length $r_{total}$, drop height h, payload position $r_{p_i}$ were varied, as well as the employment of magnetic/non-magnetic counterweights. These experiments were initiated with taut lines ($r_{total}=r_{p_i}+r_{cw_i}$). A total of 123 different experiments were conducted. The list and range of experimental variables tested in these experiments are shown in Table II in FIG. 15.

Data Processing

For the experiments performed, 1000 frames of data were obtained, starting from within 10 frames of initial release. When sufficient markers were occluded to impede subject tracking, cubic interpolation was employed to fill in the gaps. Various example embodiments limit the analysis to the first 600 frames of data, which is a sufficiently long duration for observing the capture event (considered as complete when the counterweight settles from motion). The Savitzky-Golay filter of degree 2 and window length 7 was used to reduce the effects of noise. Furthermore, derivatives of displacement were computed using a central difference method.

Experimental Results & Design Implications

Figure 16:
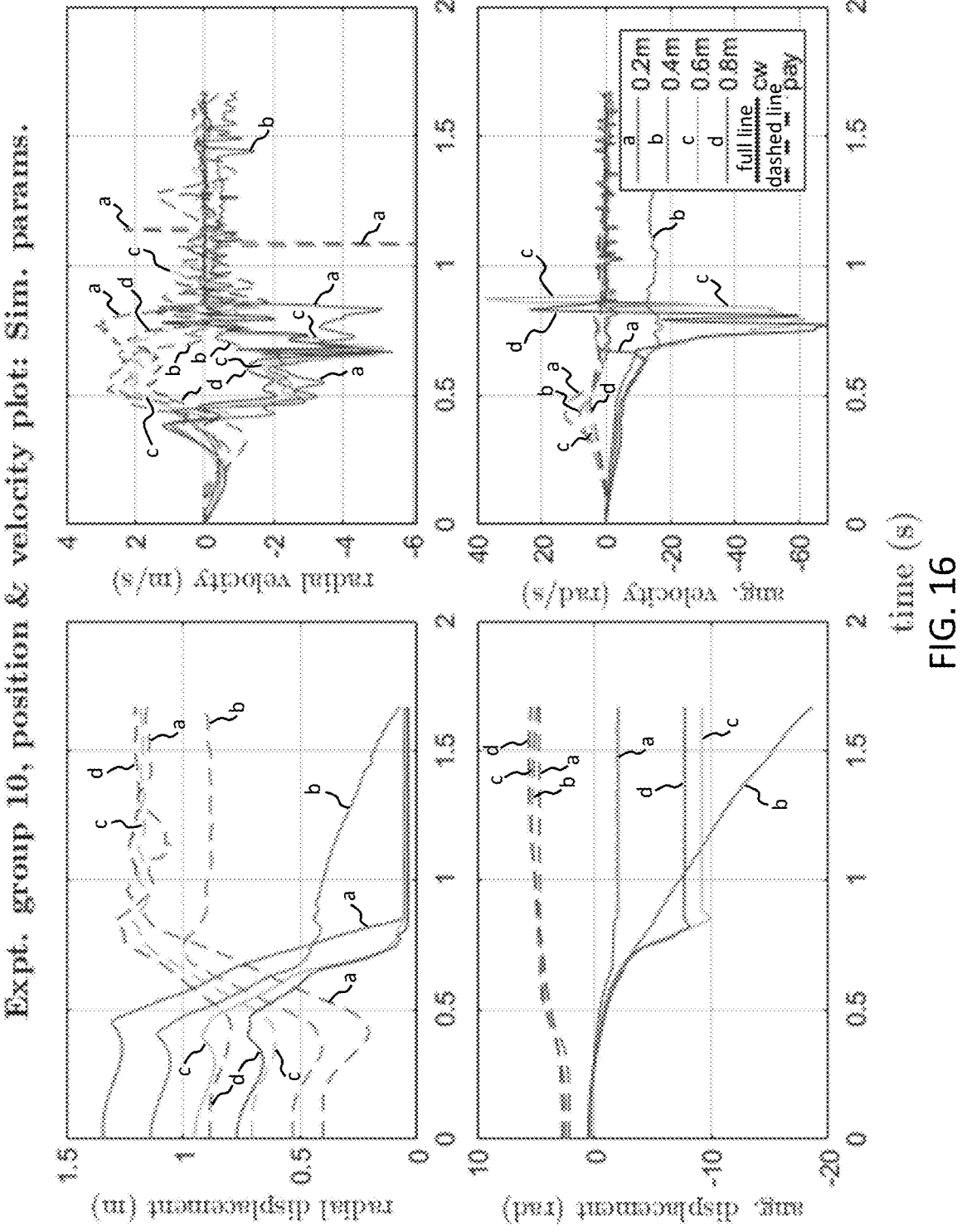
FIG. 16 depicts position (displacement) and velocity plots for the payload and the counterweight of real-world experiments from experiment group 10 loaded with the same base simulation parameters in Table I (magnet, $r_{total}$=1.5 m, $m_p$=284 g, $m_{cw}$=51 g, h=1.0 m), according to various example embodiments of the present invention.

FIG. 16 depicts position (displacement) and velocity plots for the payload and the counterweight of real-world experiments from experiment group 10 loaded with the same base simulation parameters in Table I (magnet, $r_{total}=1.5$ m, $m_p=284$ g, $m_{cw}=51$ g, h=1.0 m). The plots correspond to both payload and counterweight positions and velocities, where each line denoted by a letter ('a', 'b', 'c' or 'd') represents an experimental result of a corresponding value of the payload offset parameter $r_p$ (the payload offset distance from the target pole-like structure), filled/full lines correspond to plots for the counterweight, and dashed lines correspond to plots for the payload. Accordingly, the plots shown in FIG. 16 correspond to a group of real-world baseline experiments through which various other experiments performed herein are compared to. In FIG. 16, it can be observed that (1) the real-world experiments generally follow the trends as predicted in the simulations and (2) the capture process can be mechanically harsh on the payload and counterweight, as observed by the sharp change in velocities on contact with the pole-like structure.

Figure 17:
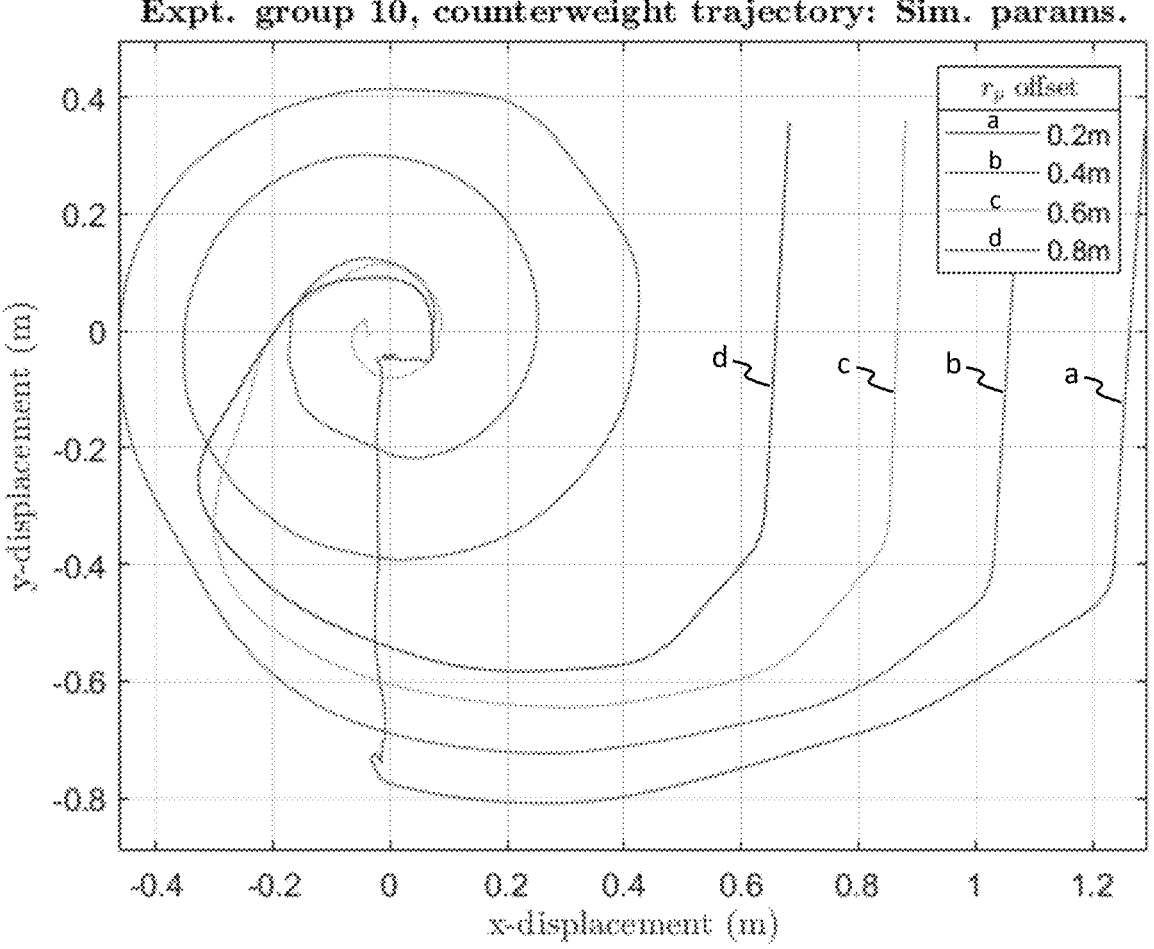
FIG. 17 depicts plots of counterweight trajectory from the experiment group 10 (same base parameters as simulation (magnet, $r_{total}$=1.5 m, $m_p$=284 g, $m_{cw}$=51 g, h=1.0 m)), according to various example embodiments of the present invention.

FIG. 17 depicts plots of counterweight trajectory from the experiment group 10 (same base parameters as simulation (magnet, $r_{total}=1.5$ m, $m_p=284$ g, $m_{cw}=51$ g, h=1.0 m)), according to various example embodiments of the present invention. The plots/lines correspond to the counterweight trajectory projected onto a 2-dimensional plane, with each plot denoted by a letter ('a', 'b', 'c' or 'd') representing the counterweight trajectory with a corresponding payload offset $r_p$ applied as indicated in FIG. 17 (e.g., a larger $r_p$ has the effect of bringing the counterweight closer to the pole, for the same tether length). It can be observed that unlike in the simulations where the counterweight follows a circular arc, the actual counterweight follows a spiral trajectory due to the nonzero radii of the lamp post, which the model does not yet account for. In practice, according to various example embodiments, there is a limit on $\theta_{wrap}$ and how short $r_{cw_i}$ can be, since a tether of fixed length can only wrap itself a number of times. In addition, line a in FIG. 17 is an example of a collision between payload and counterweight, which explains why line a follows an anomalous trajectory compared to spirals of lines b c and d. Finally, when counting the number of loops, line b ($r_p=0.4$ m) was the best performer compared to lines c and d, suggesting that a counterweight further from the pole-like structure is beneficial for wrapping, provided the counterweight and payload do not collide mid-air as in line a.

Figure 20:
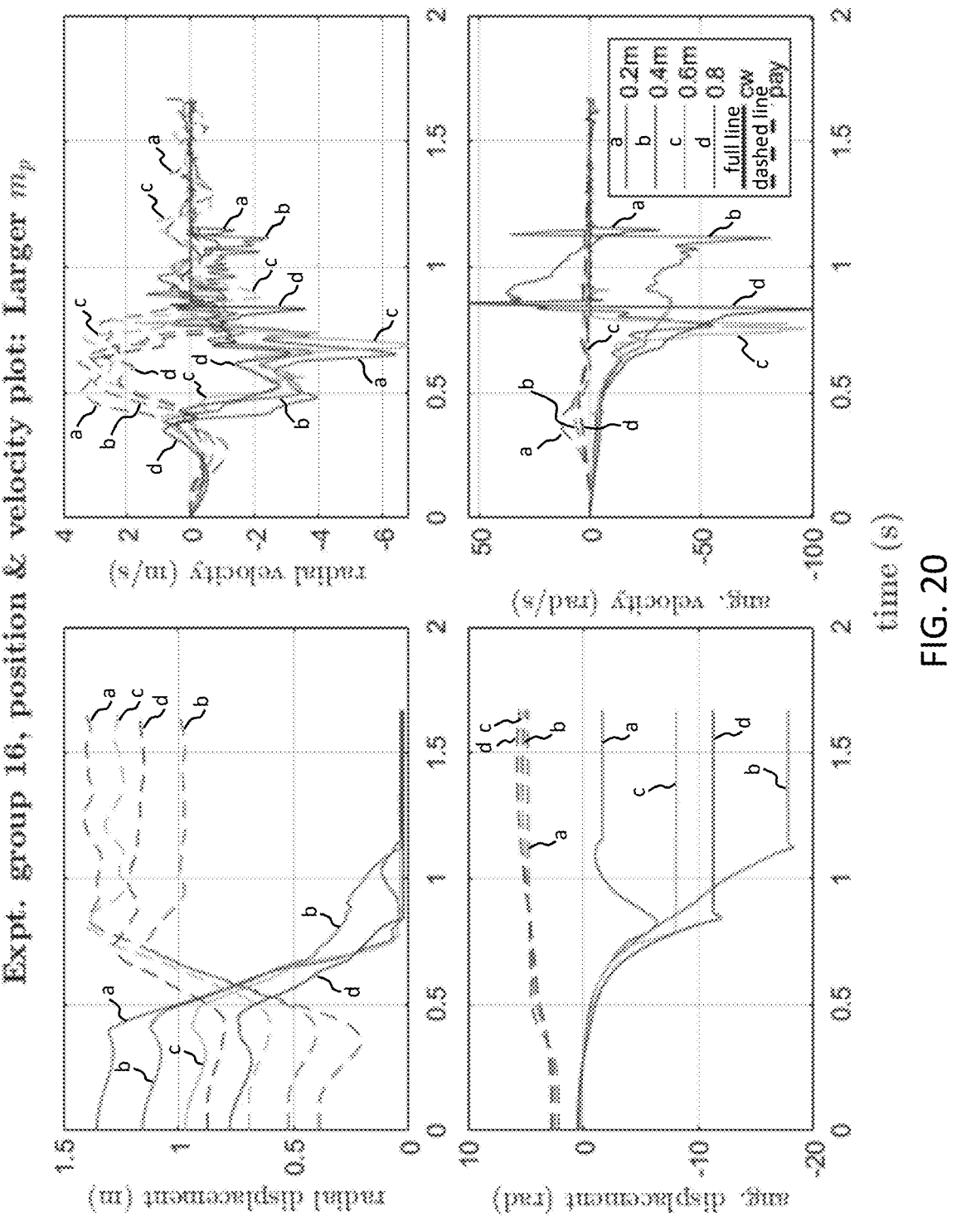
FIG. 20 depicts position (displacement) and velocity plots for the payload and the counterweight of real-world experiments from experiment group 16 with a heavier payload (magnet, $r_{total}$=1.5 m, $m_p$=607 g, $m_{cw}$=51 g, h=1.0 m), according to various example 15 embodiments of the present invention.

FIG. 20 depicts position (displacement) and velocity plots for the payload and the counterweight of real-world experiments from experiment group 16 with a heavier payload (magnet, $r_{total}=1.5$ m, $m_p=607$ g, $m_{cw}=51$ g, h=1.0 m), according to various example embodiments of the present invention. Within this experiment group that tests with a heavier payload, more energy is available for conversion into rotational kinetic energy. For example, comparing the angular velocities $\dot{\theta}_{cw}$ of FIG. 20 with those in FIG. 16 reveals an increase as predicted by simulations in FIG. 10. Unlike the simulations however, the real-world angular velocities are still greater. This is due to tether wrapping which continuously shortens the line during the capture process. From an application perspective, this mean that a heavier payload subjects the system to increased loading.

Furthermore, in FIG. 16, it can be observed from the radial displacement plots that $r_{cw}$ increases around t=0.5 s, due to a combination of stretching and imperfect tautness as suggested by the dissimilar 'humps' (see lines a b c and d in FIG. 16) which the simulation model lacks (compare with FIG. 9), and which agrees with (1) the finding above that the tether 124 should not be perfectly taut, and (2) that the tether when subject to tensile loads during the deployment process undergoes a small degree of temporary elongation. Together, they contribute to the measurable increase in radial displacement from the centre, represented by the "humps" in FIG. 16.

In FIG. 17, it can be observed that the plot of $r_{p_i}$=0.2 m encodes the effect of collisions on counterweight trajectories which are omitted in simulations. It is undesirable to have collisions, as it prevents the wrapping of the counterweight around the pole-like structure, through which the capture process remains contingent on.

Figure 21:
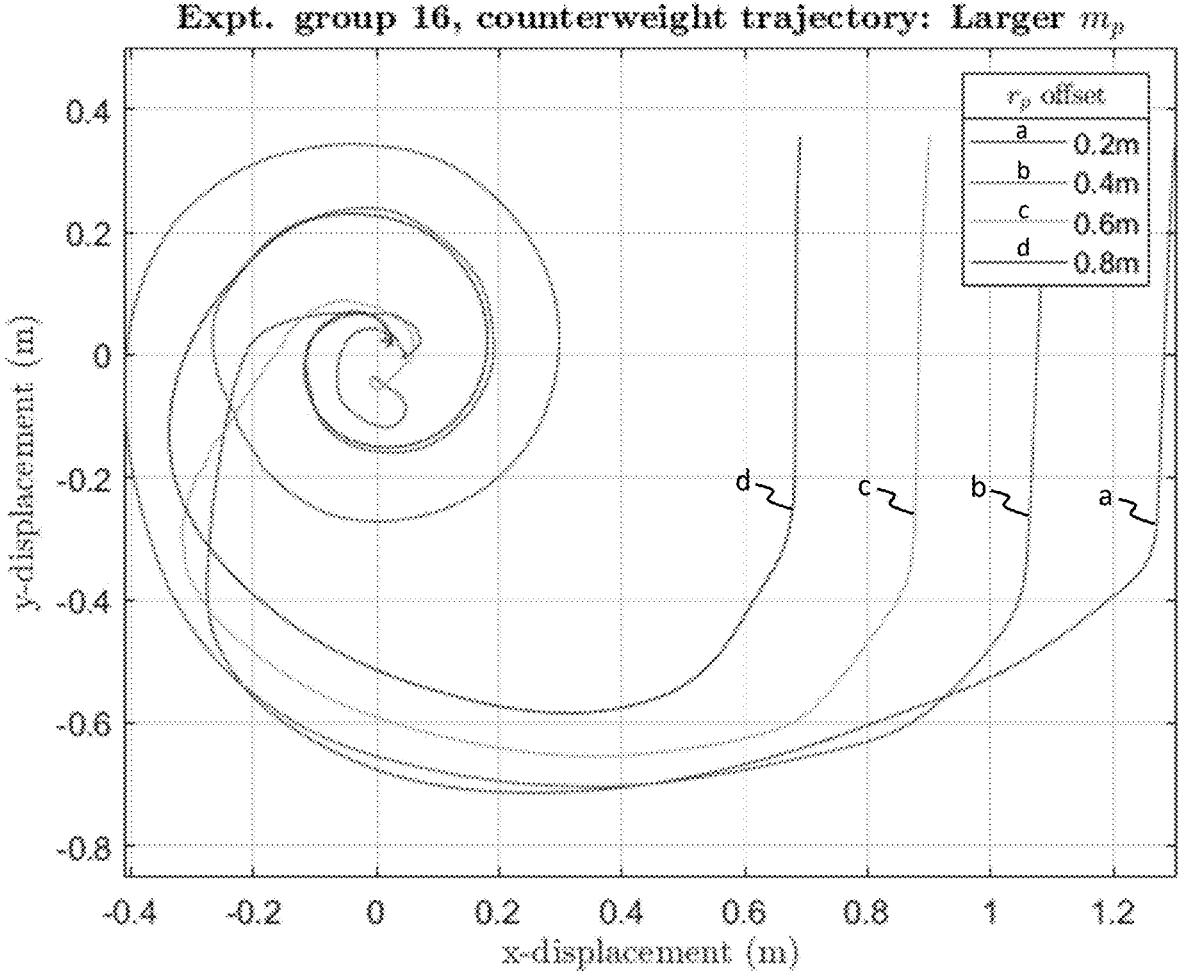
FIG. 21 depicts plots of counterweight trajectory from experiment group 16 with the heavier payload, according to various example embodiments of the present invention.

FIG. 21 depicts plots of counterweight trajectory from experiment group 16 with the heavier payload (magnet, $r_{total}$=1.5 m, $m_p$=607 g, $m_{cw}$=51 g, h=1.0 m), according to various example embodiments of the present invention. It can be observed that the counterweight trajectories in FIGS. 17 and 21 agree with the trends predicted by the simulations shown in FIG. 11. For example, the overestimation of simulated trajectory radii in FIG. 11 over real-world data may be attributed to the effects of wrapping and deviations in friction coefficient µ.

Figure 18:
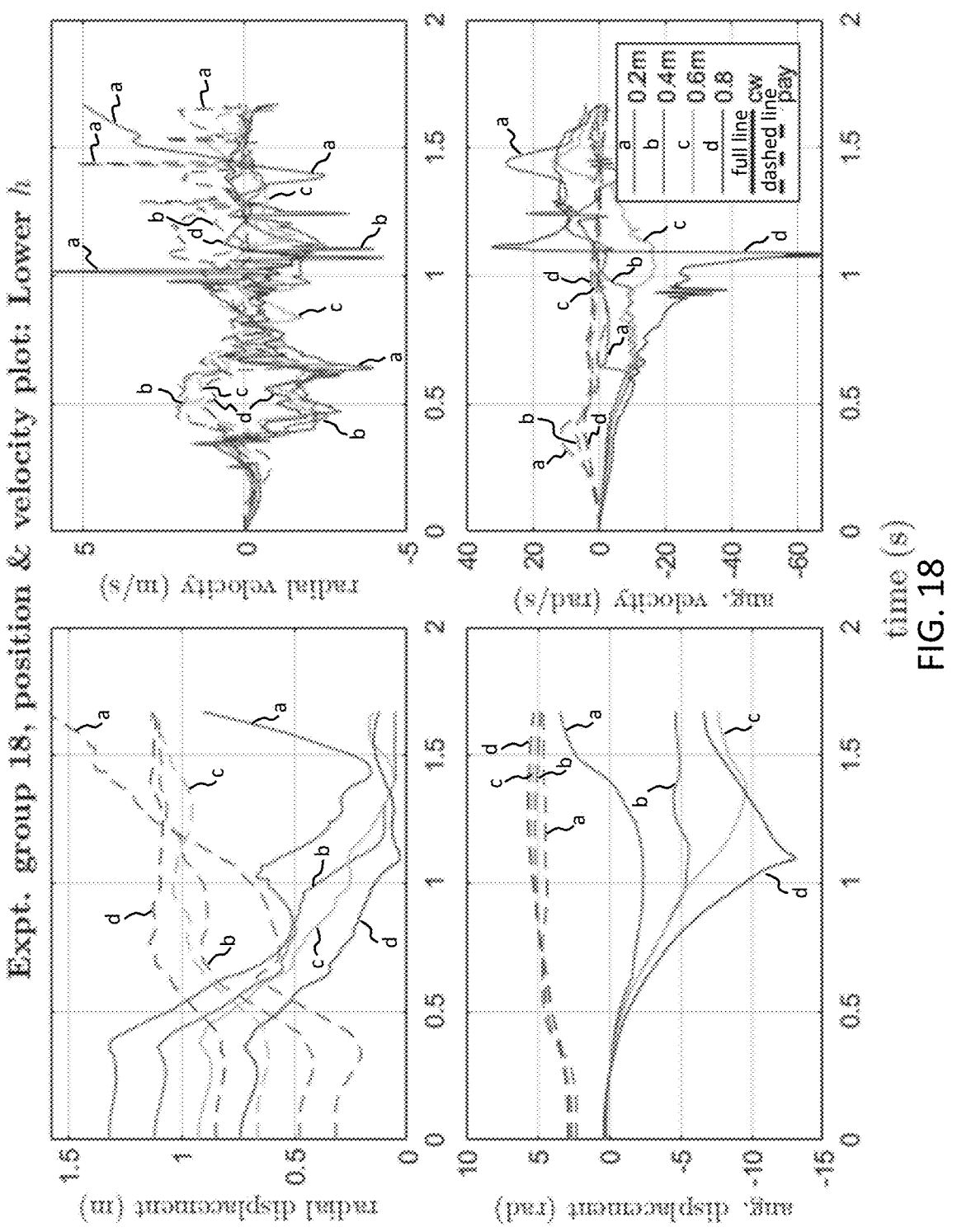
FIG. 18 depicts position (displacement) and velocity plots for the payload and the counterweight of real-world experiments from experiment group 18 with a lower starting height (magnet, $r_{total}$=1.5 m, $m_p$=284 g, $m_{cw}$=51 g, h=0.8 m), according to various example embodiments of the present invention.

FIG. 18 depicts position (displacement) and velocity plots for the payload and the counterweight of real-world experiments from experiment group 18 with a lower starting height (magnet, $r_{total}$=1.5 m, $m_p$=284 g, $m_{cw}$=51 g, h=0.8 m), according to various example embodiments of the present invention. It can be observed that lowering the starting drop height from 1 m (FIG. 16) to 0.8 m (FIG. 18) reduces the energy that needs to be dissipated during capture, which results in lower radial and angular velocities as shown in FIG. 18. For example, releasing closer to the pole-like structure places less strain on the system, which is thus more suitable for deployment of more fragile payloads.

Figure 19:
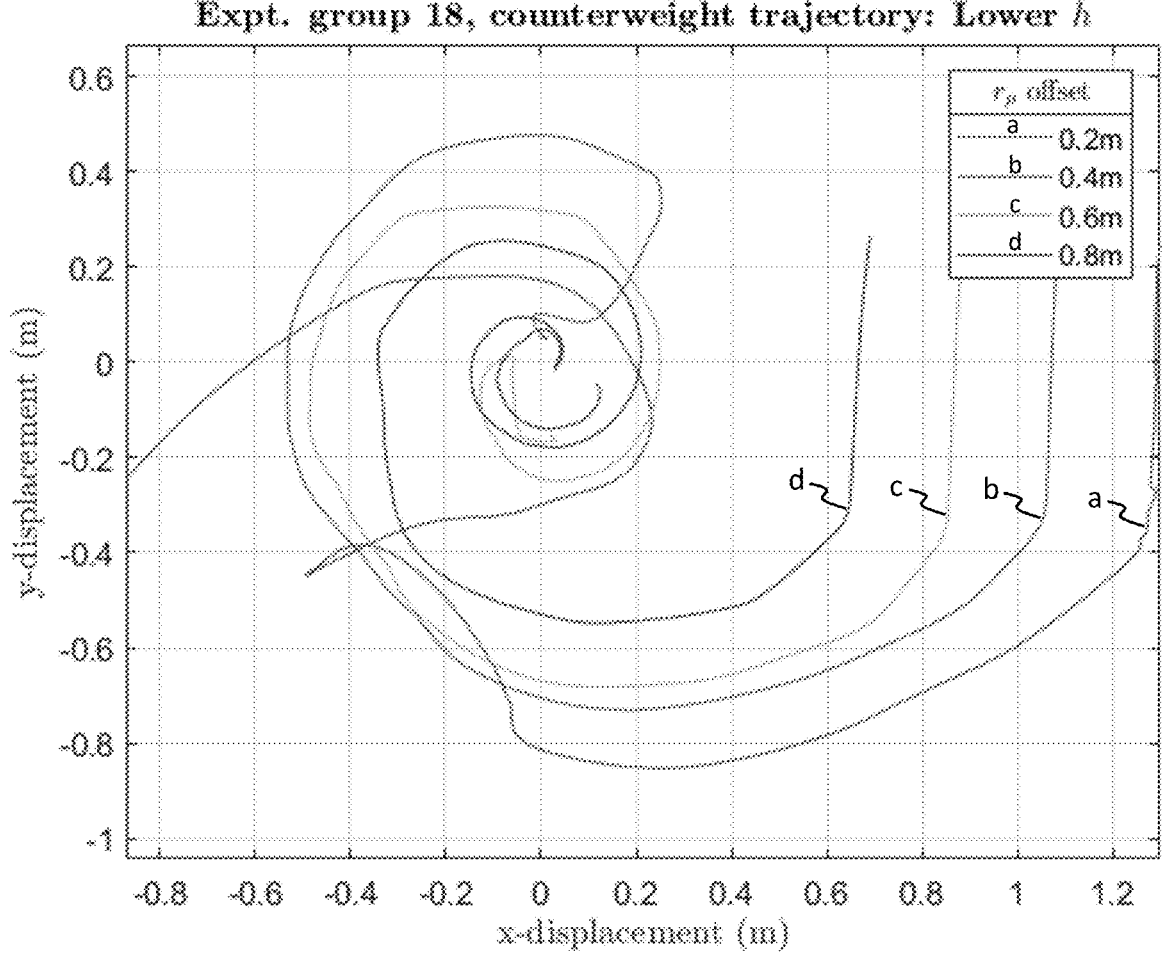
FIG. 19 depicts plots of counterweight trajectory from the experiment group 18 with a lower starting height (magnet, $r_{total}$=1.5 m, $m_p$=284 g, $m_{cw}$=51 g, h=0.8 m), according to various example embodiments of the present invention.

FIG. 19 depicts plots of counterweight trajectory from experiment group 18 with a lower starting height (magnet, $r_{total}$=1.5 m, $m_p$=284 g, $m_{cw}$=51 g, h=0.8 m), according to various example embodiments of the present invention. For example, FIG. 19 shows the effect of reducing drop height from h=1.0 m to 0.8 m. Comparing the counterweight trajectories against FIG. 17 reveals a tighter path due to the system's reduced initial potential energy, accompanied with reduced wrapping. Furthermore, it can be observed that payload mass $m_p$ did not seem to affect trajectory to the same extent as drop height (see FIG. 21), although the trajectory radii was tightened up as predicted in simulations.

From various experiments performed, a preferred or ideal range (e.g., Goldilocks Zone) for $r_{p_i}$ according to various example embodiments may be from 0.4 m to 0.8 m (or the ratio of $r_{p_i}$ to the entire operating length of the tether may be from 0.25 to 0.5, or more preferably, 0.26 to 0.4). For example, the preferred range for $r_{p_i}$ has been found to avoid a collision between the payload and the counterweight. For example, it was found that values below such a preferred range may result in a failed capture due to payload-counterweight collisions, whereas values above the preferred range may result in payload-tether collisions.

Figure 22:
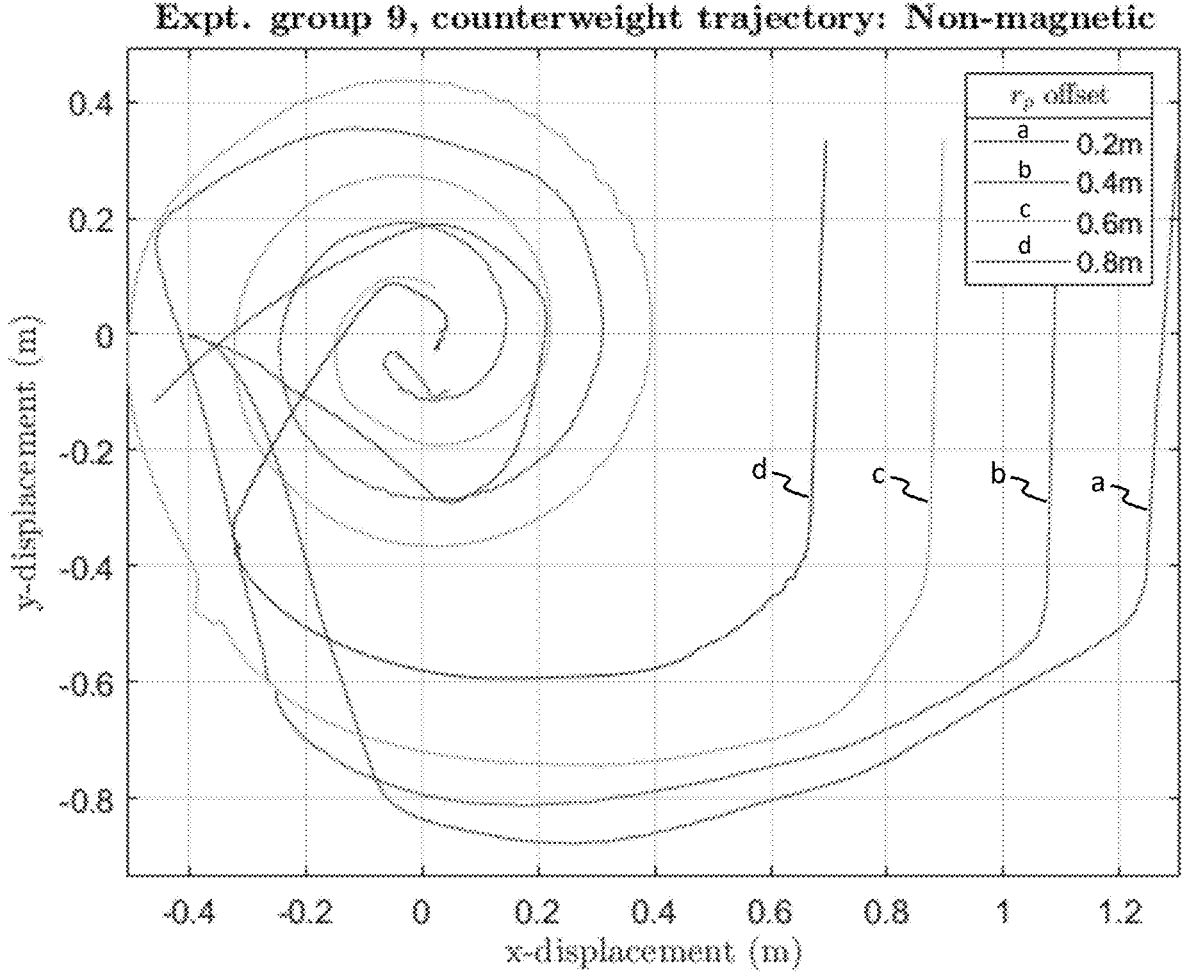
FIG. 22 depicts plots of counterweight trajectory from the experiment group 9 with a non-magnetic counterweight (non-magnet, $r_{total}$=1.5 m, $m_p$=284 g, $m_{cw}$=66 g, h=1.0 m), according to various example embodiments of the present invention.

Various example embodiments found that magnetic counterweight greatly increased capture strength on ferrous structures. The limit was evaluated by experiments by gradually reducing the payload to counterweight mass (PtCM) ratio until repeatable capture was obtained. For non-magnetic capture the maximum PtCM ratio found to be approximately 6:1, whereas magnetic capture was found to be viable as high as 12:1. In various experiments performed, attempts to proceed further were met with tether failure, suggesting the maximum PtCM ratio may be even higher. It was found that magnetic counterweight also offered improved capture reliability, for example, by mitigating the tendency of counterweights to bounce back and unwind on impact with the lamp post. Accordingly, in the case of the counterweight being non-magnetic according to various example embodiments, the counterweight provided is lighter than the payload and a weight ratio of the payload to the counterweight is up to about 6:1. According to various example embodiments, in the case of the counterweight being magnetic, the counterweight is lighter than the payload and a weight ratio of the payload to the counterweight is up to about 12:1. In some instances, magnets prevented capture failure due to collisions (see FIG. 17, $r_{p_i}$=0.2 m), a feature unavailable with non-magnetic counterweights (see FIG. 22, $r_{p_i}$=0.2 m). In particular, FIG. 22 depicts a plot of counterweight trajectory from the experiment group 9 with non-magnetic counterweights (non-magnet, $r_{total}$=1.5 m, $m_p$=284 g, $m_{cw}$=66 g, h=1.0 m), according to various example embodiments of the present invention.

Accordingly, for the aerial payload deployment system according to various example embodiments, the release offset $r_p$ of the payload (or correspondingly for the release offset of the counterweight) may be targeted to be within a preferred range or zone of 0.25 to 0.5 (the ratio of $r_p$ to the entire operating length of the tether), or more preferably 0.26 to 0.4, such as to avoid payload-counterweight collision (see FIG. 19, $r_{p_i}$=0.2 m). In addition, as explained above, a magnetic counterweight may be employed according to various example embodiments since experiments performed revealed significant increases in capture probability when used against a ferrous pole-like structure. For better capture reliability, various example embodiments keep or set the PtCM ratio to within the above-mentioned two maximum PtCM ratio limits for non-magnetic counterweight and magnetic counterweight, respectively. Furthermore, according to various example embodiments, the tethered payload system is deployed from a height of at least about 0.5 m above the pole-like structure. For example, otherwise, the counterweight may collide with the aerial vehicle as suggested by the plot (line b) in FIG. 17 (the path traced by the counterweight shows that it traces an arc of radius 0.4 m). Therefore, an aerial vehicle within 0.5 m is within centimetres of being hit by the rotating counterweight.

Example Payload Deployment Systems

In various example embodiments, the payload deployment system is coupled or couplable to the aerial vehicle and configured to deploy a payload to a pole-like structure (an elevated lateral pole-like structure). The payload deployment system comprises: a tethered payload system comprising a tether having a first end portion and a second end portion; and a counterweight coupled to the first end portion of the tether, the second end portion of the tether being coupled or couplable to the payload to be deployed. The payload deployment system further comprises a payload release system configured to releasably secure the tethered payload system and is actuatable to release the tethered payload system in a manner such that when the tethered payload system descends towards the pole-like structure after being released for the pole-like structure, the counterweight is spaced laterally apart from the payload, and the payload and the counterweight are at opposite sides of the pole-like structure when the tether reaches and contacts with the pole-like structure. More particularly, the tethered payload system is configured such that, after the tether reaches and contacts with the pole-like structure, the counterweight rotates about the pole-like structure thereby causing a portion of the tether up to the first end portion to wrap around the pole-like structure until the counterweight engages therewith and thereby securing the payload to the pole-like structure.

Accordingly, it will be appreciated by a person skilled in the art that the present invention encompasses any payload deployment system comprising a tethered payload system and a payload release system configured as described herein according to various example embodiments of the present invention, and more particularly, as long as the payload deployment system (or the payload release system) is configured to releasably secure the tethered payload system and is actuatable to release the tethered payload system to the pole-like structure in the above manner as described herein according to various example embodiments of the present invention to secure or attach the payload to the pole-like structure. By way of examples, two example payload deployment systems will now be described according to various example embodiments of the present invention. It will be appreciated by a person skilled in the art that the present invention is not limited to the specific configurations/structures of the two example payload deployment systems described.

Elongated Frame Structure-Based Payload Deployment System

Figure 23A:
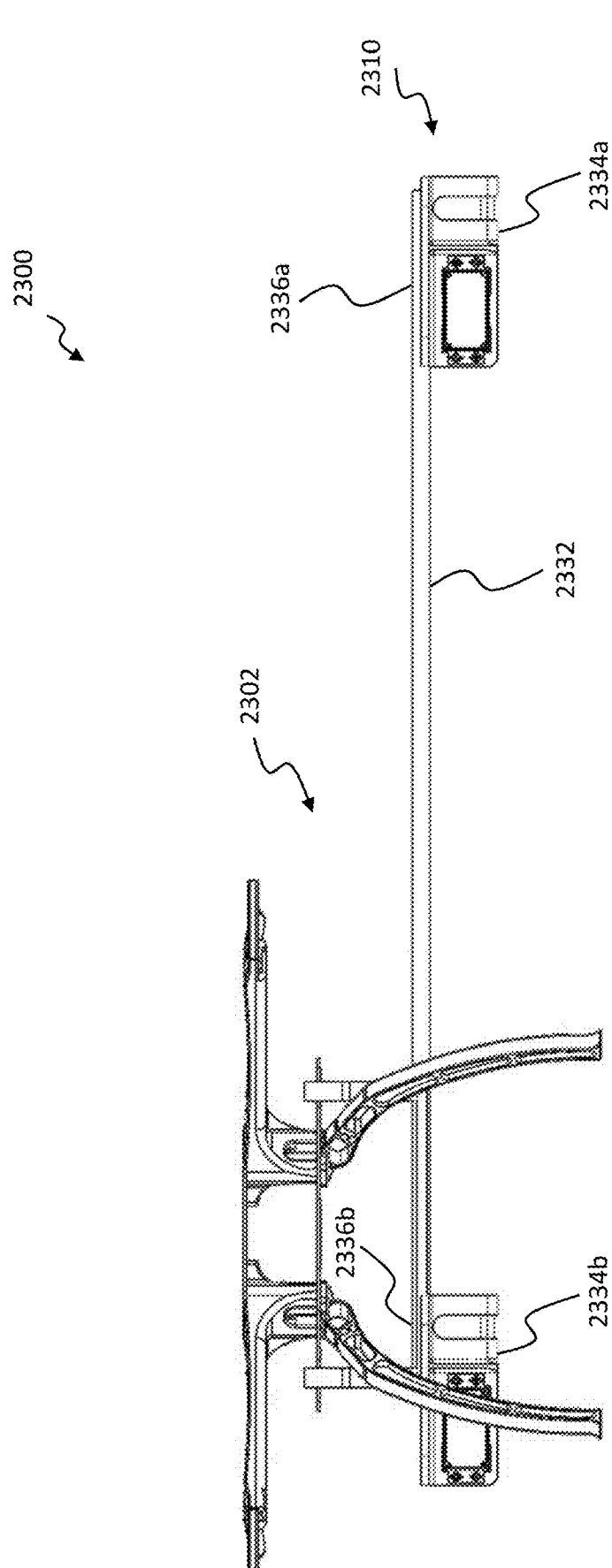
FIGS. 23A and 23B depict schematic drawings (side view and top view, respectively) of a first example aerial payload deployment system, according to various first example embodiments of the present invention.
Figure 23B:
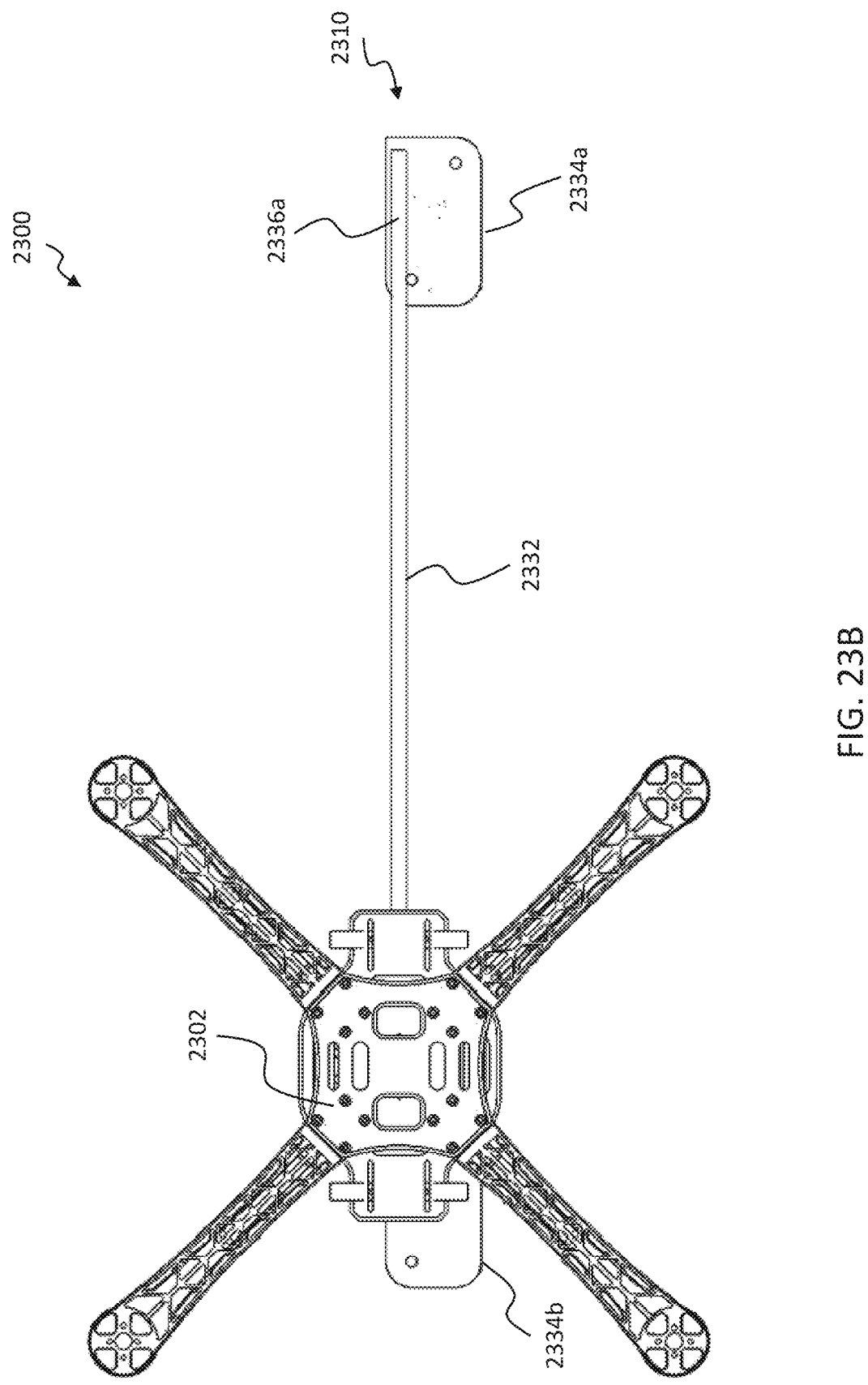
Figure 23C:
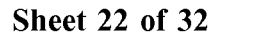
FIG. 23C shows a picture of an example prototype of the first example aerial payload deployment system, according to various first example embodiments of the present invention.

FIGS. 23A and 23B depict schematic drawings (side view and top view, respectively) of a first example aerial payload deployment system 2300 according to various first example embodiments of the present invention. For illustration purposes only and without limitation, FIG. 23C shows a picture of an example prototype of the first example aerial payload deployment system 2300 according to various first example embodiments of the present invention. As shown, the aerial payload deployment system 2300 comprises: an aerial vehicle 2302 (e.g., a rotorcraft such as a quadcopter) comprising a flight controller 2304 (e.g., shown in FIG. 23C) operable to control a flight of the aerial vehicle 2302; and a payload deployment system 2310 coupled or couplable to the aerial vehicle 2302 and configured to deploy a payload to a pole-like structure. In particular, the payload deployment system 2310 comprises: a tethered payload system (not shown in FIGS. 23A to 23C) as described herein according to various example embodiments; and a payload release system (comprising a first actuatable release mechanism 2334a and a second actuatable release mechanism 2334b) configured to releasably secure the tethered payload system and is actuatable to release the tethered payload system in a manner such that when the tethered payload system descends towards the pole-like structure after being released for the pole-like structure, the counterweight is spaced laterally apart from the payload, and the payload and the counterweight are at opposite sides of the pole-like structure when the tether reaches and contacts with the pole-like structure.

In various first example embodiments, as shown in FIGS. 23A to 23C, the payload deployment system 2310 comprises an elongated frame structure 2332 (or an elongated rod, e.g., a carbon fiber reinforced polymer (CFRP) rod). In this regard, the payload release system comprises: a first actuatable release mechanism 2334a and a second actuatable release mechanism 2334b located at a first section 2336a and a second section 2336b, respectively, of the elongated frame structure 2332. In this regard, the first and second sections 2336a, 2336b are spaced apart from each other and the first and second actuatable release mechanisms 2334a, 2334b are configured to releasably secure the counterweight and the payload, respectively. The payload release system further comprises a release controller 2338 (e.g., shown in FIG. 23C) communicatively coupled (e.g., wired communication as shown in FIG. 23C, or wireless communication) to the first and second actuatable release mechanisms 2334a, 2334b and is operable to actuate the first and second actuatable release mechanisms 2334a, 2334b to release the counterweight and the payload, respectively. In various first embodiments, the first and second sections 2336a, 2336b are spaced apart from each other with a distance therebetween of about 50% to 100% of the entire operating length of the tether of the tethered payload system secured, or intended to be secured, by the payload release system. For example, the first actuatable release mechanism 2334a may comprise a first release servo configured to control (e.g., retract) a first release pin for releasing the counterweight. Similarly, the second actuatable release mechanism 2334b may comprise a second release servo configured to control (e.g., retract) a second release pin for releasing the payload.

Accordingly, in various first embodiments, the first actuatable release mechanism 2334a and the second actuatable release mechanism 2334b are located at the first section 2336a and the second section 2336b, respectively, of the elongated frame structure 2332, whereby the first and second sections 2336a, 2336b are spaced apart from each other, such that when the first and second actuatable release mechanisms 2334a, 2334b are actuated to release the counterweight and the payload, respectively, the tethered payload system descends towards the pole-like structure and the counterweight is spaced laterally apart (e.g., corresponding to the distance in which the first and second sections 2336a, 2336b (i.e., the first and second actuatable release mechanisms 2334a, 2334b) are spaced apart) from the payload, and the payload and the counterweight are at opposite sides of the pole-like structure when the tether reaches and contacts with the pole-like structure. Thereafter, the counterweight rotates about the pole-like structure thereby causing a portion of the tether up to the first end portion of the tether to wrap around the pole-like structure until the counterweight engages therewith and thereby securing the payload to the pole-like structure.

Figure 24:
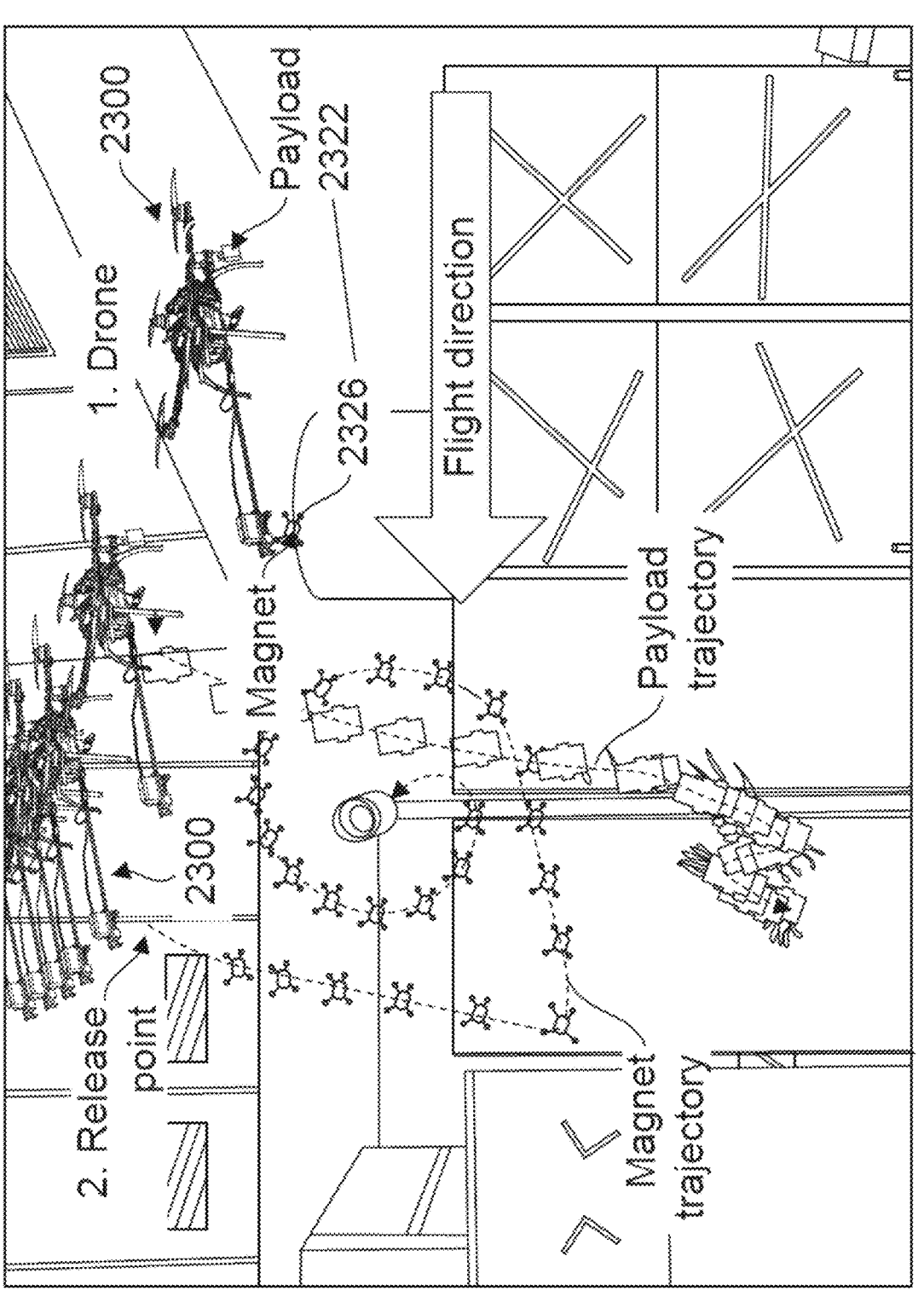
FIG. 24 depicts an example illustration of the first example aerial payload deployment system deploying or releasing the tethered payload system, according to various first example embodiments, along with the resultant trajectories of the payload and the counterweight.
Figure 25:
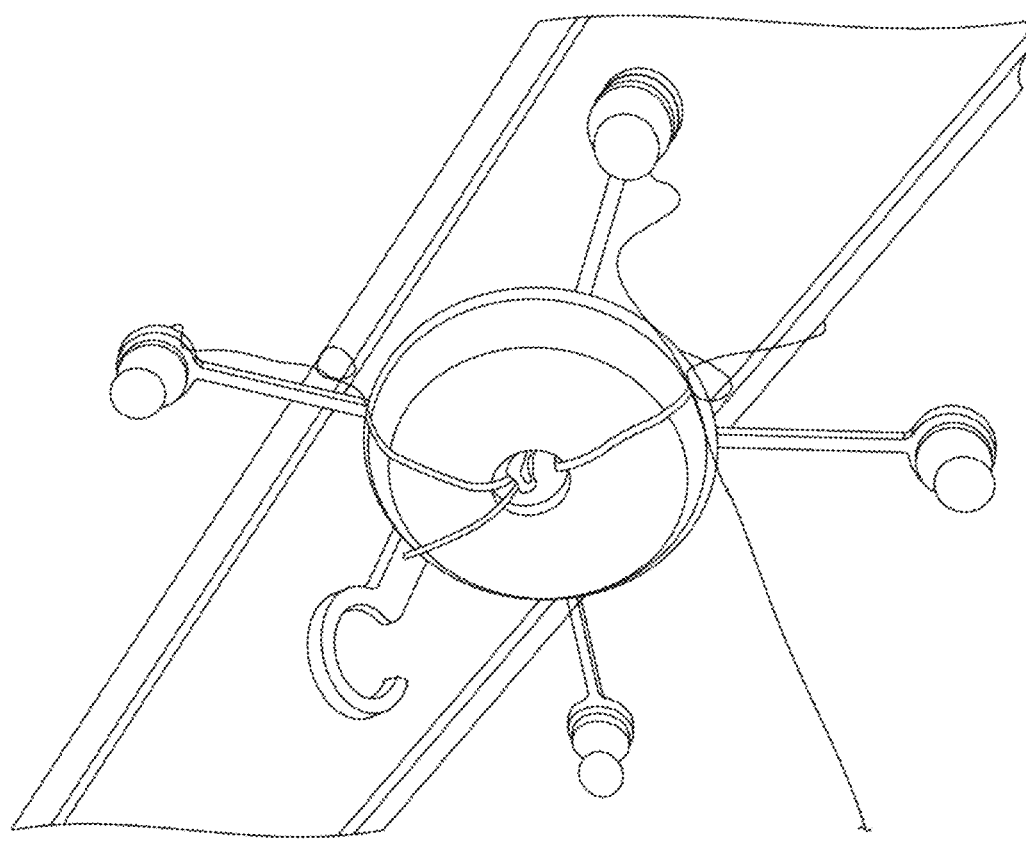
FIG. 25 illustrates an example captured state of the counterweight (when the counterweight is engaged with the pole-like structure), according to various example embodiments of the present invention.

For example, the payload deployment system 2310 may be coupled onto or integrated with a rotorcraft (e.g., a S550 quadcopter) as shown in FIG. 23C. For example, the additional hardware required to deploy the tethered payload system (GRASPER) only weighs 238 g, comprising the elongated rod 2332 and the first and second actuatable release mechanisms 2334a, 2334b, which, for example, permits a 1800 g payload while keeping a 2:1 thrust-to-weight ratio on the example rotorcraft (3344 g at 50% thrust). Nevertheless, for the manually-flown demonstration flight shown in FIG. 24, the same 284 g payload was used. In particular, FIG. 24 depicts an example illustration of the first example aerial payload deployment system 2300 deploying or releasing the tethered payload system according to various example embodiments, along with the resultant trajectories of the payload 2322 and the counterweight 2326. FIG. 25 illustrates an example capture state of the counterweight, that is, when the counterweight is engaged with the pole-like structure.

Launcher-Based Payload Deployment System

Figure 26A:
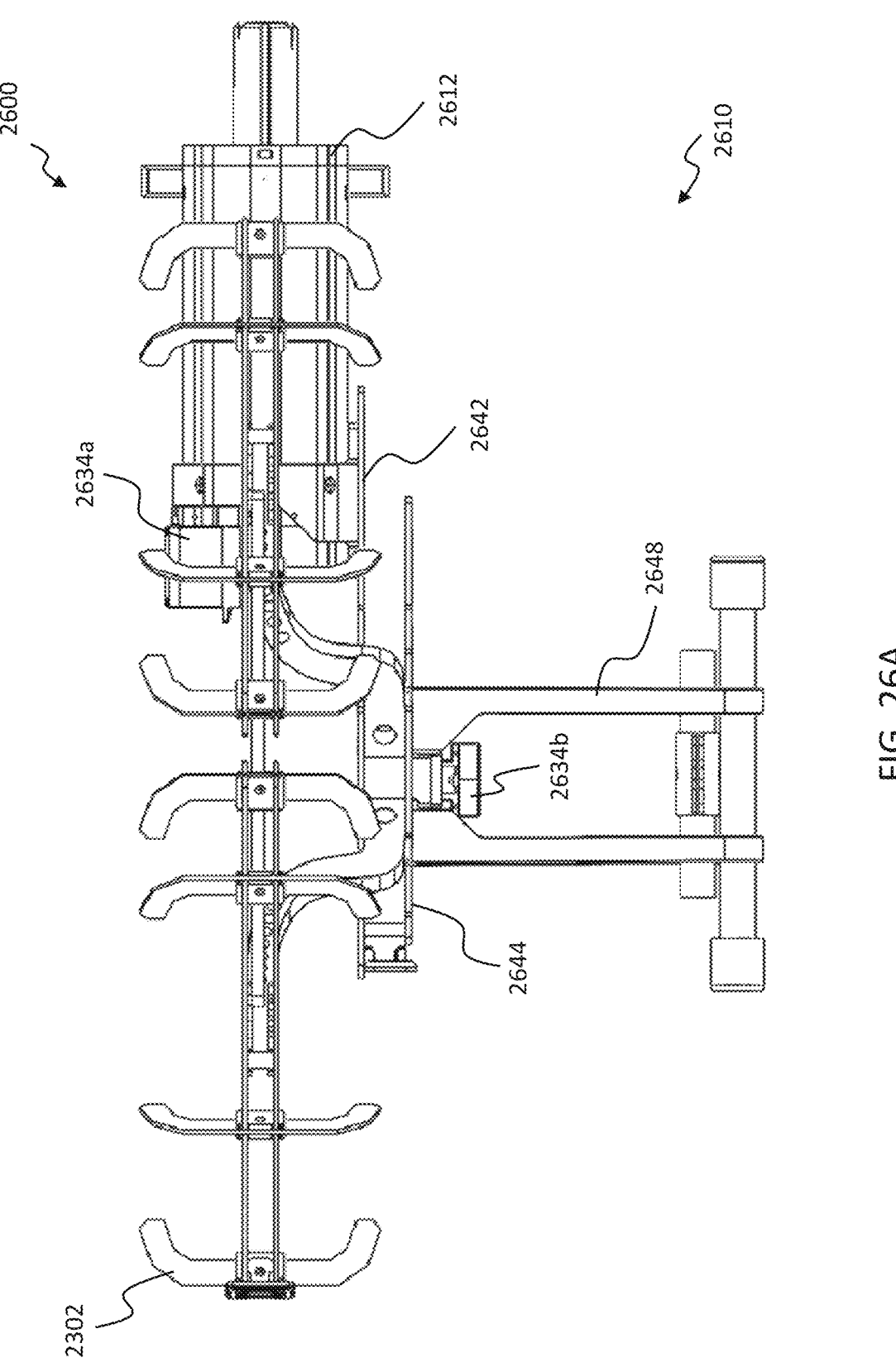
FIGS. 26A and 26B depict schematic drawings (side view and top view, respectively) of a second example aerial payload deployment system, according to various second example embodiments of the present invention.
Figure 26B:
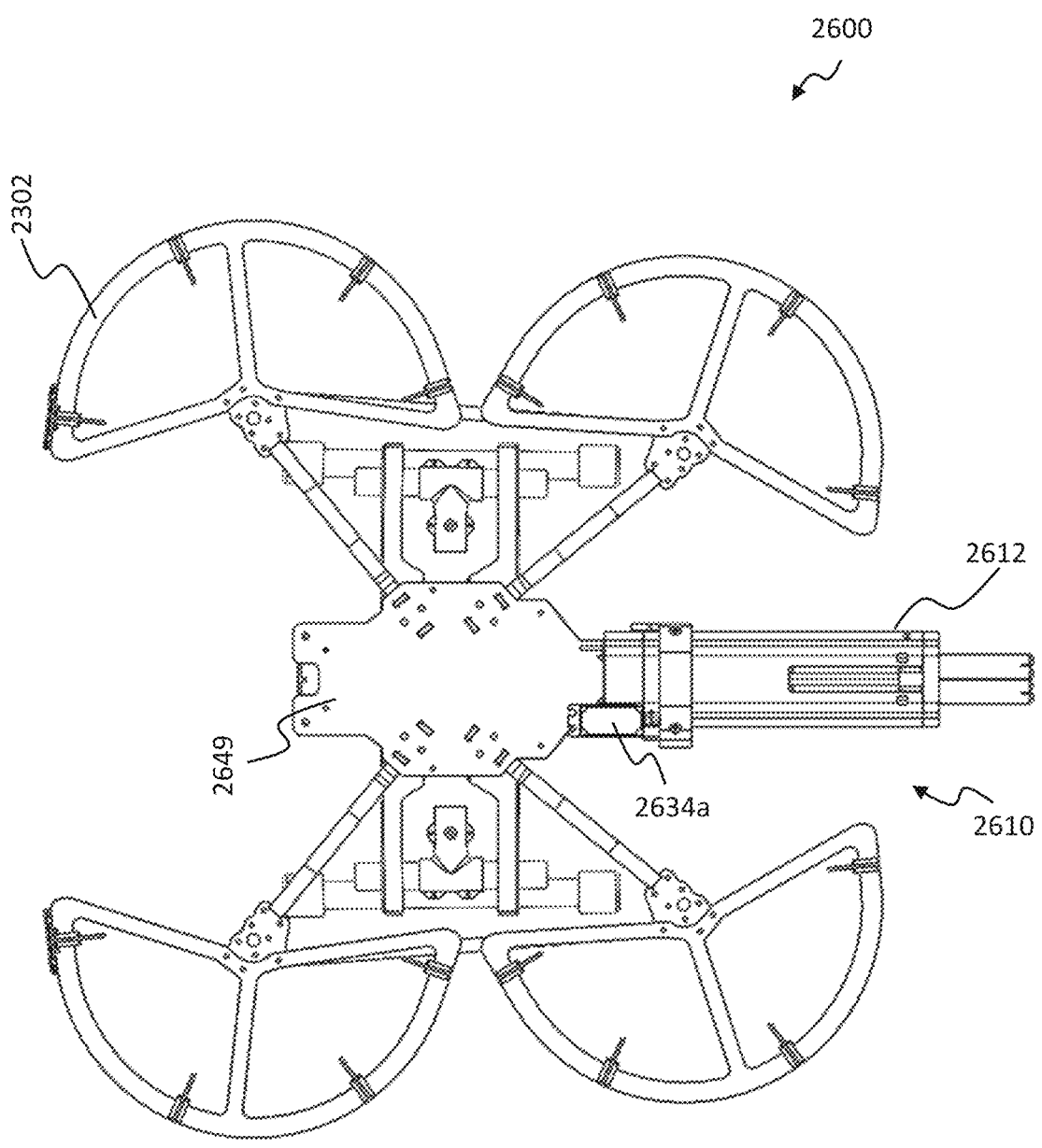

FIGS. 26A and 26B depict schematic drawings (side view and top view, respectively) of a second example aerial payload deployment system 2600 according to various second example embodiments of the present invention. For example, the second example aerial payload deployment system 2600 may have the same or similar aerial vehicle as the first example aerial payload deployment system 2300 except that the payload deployment system is different and is launcher-based and the second example aerial payload deployment system 2600 is configured to secure or couple to such a payload deployment system 2610. In particular, the second example aerial payload deployment system 2600 comprises: an aerial vehicle 2302 (e.g., a rotorcraft such as a quadcopter) comprising a flight controller operable to control a flight of the aerial vehicle 2302; and a payload deployment system 2610 coupled or couplable to the aerial vehicle 2302 and configured to deploy a payload to a pole-like structure. In particular, the payload deployment system 2610 comprises: a tethered payload system (not shown in FIGS. 26A and 26B) as described herein according to various example embodiments; and a payload release system (comprising a first actuatable release mechanism 2634a and a second actuatable release mechanism 2634b) configured to releasably secure the tethered payload system and is actuatable to release the tethered payload system in a manner such that when the tethered payload system descends towards the pole-like structure after being released for the pole-like structure, the counterweight is spaced laterally apart from the payload, and the payload and the counterweight are at opposite sides of the pole-like structure when the tether reaches and contacts with the pole-like structure.

In particular, according to various second example embodiments, the payload deployment system 2610 comprises a launcher 2612 comprising a chamber 2731 (see FIG. 27D) for housing the counterweight. In this regard, the payload release system comprises: a first actuatable release mechanism 2634a configured to, when actuated, trigger the launcher 2612 to eject the counterweight from the chamber 2731 such that the counterweight is spaced laterally apart from the payload after being released for the elevated lateral pole-like structure; a second actuatable release mechanism 2634b configured to releasably secure the payload; and a release controller communicatively coupled to the first and second actuatable release mechanisms 2634a, 2634b and is operable to actuate the first and second actuatable release mechanisms 2634a, 2634b to trigger the launcher 2612 and release the payload, respectively. In various second example embodiments, the release controller is configured to release the payload about 0.1 to 1 second (depending on various factors (e.g., the operating length of the tether and the mass of the counterweight) as described hereinbefore) after the launcher 2612 is triggered to eject the counterweight from the chamber.

In various second example embodiments, as shown in FIG. 26A, the second example aerial payload deployment system 2600 may further comprise a launcher support deck 2642 for supporting the launcher 2612, a payload support deck 2644 for supporting a payload, and a landing gear 2648. In addition, as shown in FIG. 26B, the aerial vehicle 2302 may comprise a surface 2649 configured as an electronic deck for enabling various electronics to be mounted thereon.

Accordingly, in various second example embodiments, a launcher 2612 is employed for housing and ejecting the counterweight such that when the first and second actuatable release mechanisms 2634a, 2634b are actuated to release the counterweight and the payload, respectively, the tethered payload system descends towards the elevated lateral pole-like structure and the counterweight is spaced laterally apart from the payload (e.g., corresponding to the distance in which the counterweight is ejected away from the payload), and the payload and the counterweight are at opposite sides of the elevated lateral pole-like structure when the tether reaches and contacts with the elevated lateral pole-like structure. Thereafter, the counterweight rotates about the elevated lateral pole-like structure thereby causing a portion of the tether up to the first end portion of the tether to wrap around the elevated lateral pole-like structure until the counterweight engages therewith and thereby securing the payload to the elevated lateral pole-like structure.

FIGS. 27A to 27D depict schematic drawings of the launcher 2612 according to various second example embodiments of the present invention. In particular, FIGS. 27A to 27D depict a perspective view, a top view, a side view and a side cross-sectional view of the launcher 2612, respectively. In various second example embodiments, the launcher 2612 may be configured with a spring-loaded mechanism configured to house the counterweight and eject or launch the counterweight to a desired distance when actuated, thereby enabling the full extension of the tether mid-flight. Accordingly, the launcher 2612 advantageously enables a more compact and light payload deployment system (e.g., compared to the above-mentioned first example embodiments), thereby reducing the overall size and weight of the aerial payload deployment system, or the payload deployment system. In addition, the spring-loaded mechanism allows for a longer operating length of the tether to be employed as desired (e.g., according to the strength of the spring-loaded mechanism), which may be infeasible in the above-mentioned first example embodiments (e.g., too long to accommodate). In this regard, a longer tether expands the set of feasible positions and velocities of the aerial vehicle 2302 from which the aerial vehicle 2302 is able to successfully release the tethered payload system from. In addition, a longer tether also increases the maximum range of the tethered payload system, which allows the aerial vehicle 2302 to deploy the tethered payload system (including the payload) from a further distance (e.g., a safer distance) from the target pole-like structure.

Figure 27A:
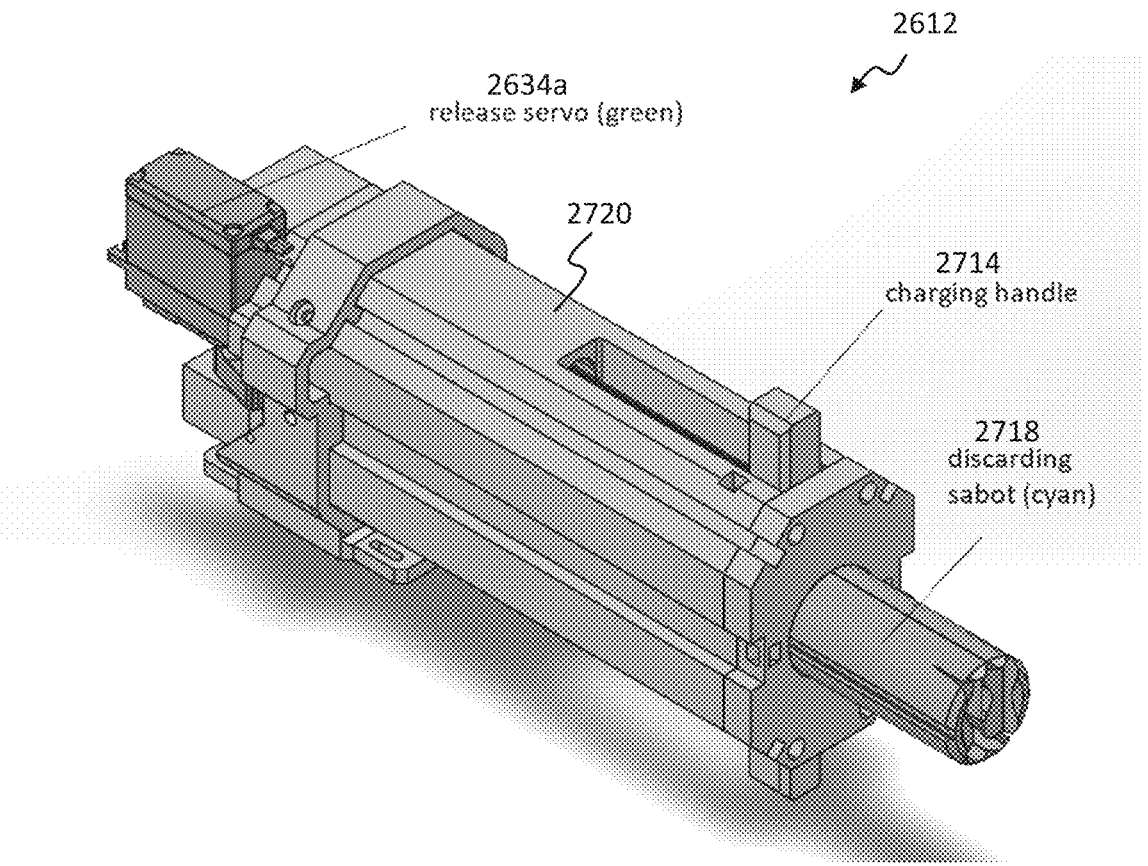
FIGS. 27A to 27D depict schematic drawings of a launcher of the second example aerial payload deployment system, according to various second example embodiments of the present invention.
Figure 27B:
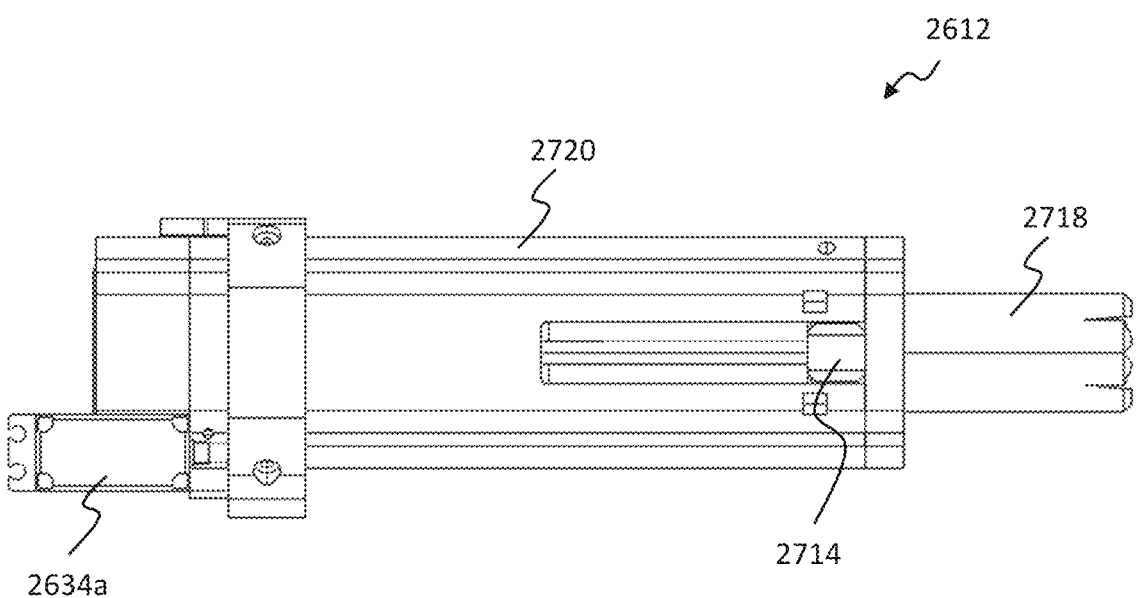
Figure 27C:
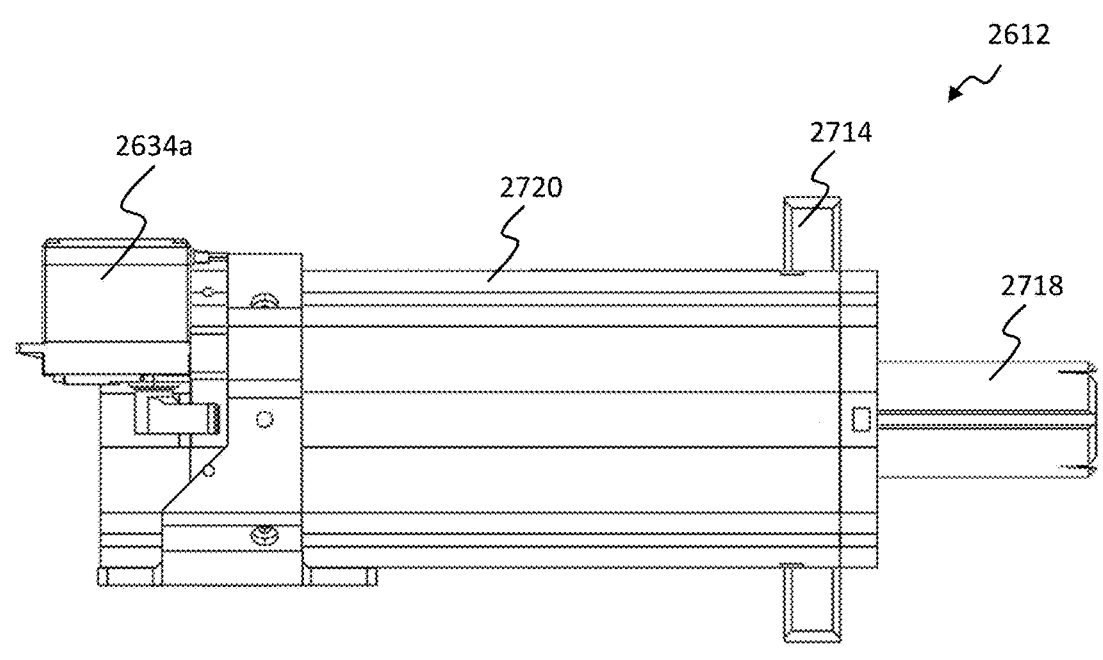
Figure 27D:
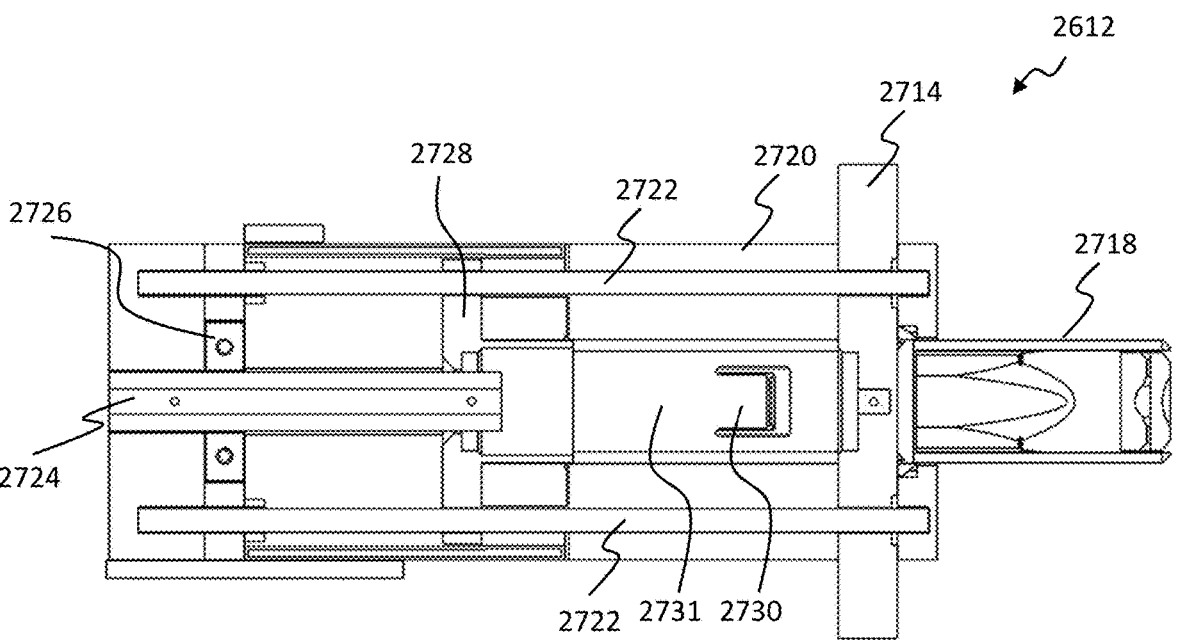

In various second example embodiments, as shown in FIGS. 27A and 27B, the spring-loaded launcher 2612 comprises a charging handle 2714 that is primed manually to a loaded state by an operator. A first actuatable release mechanism (e.g., comprising a first release servo) 2634a may be coupled to the launcher 2612 and connected to a release controller (e.g., microcontroller) for controlling the actuation of the first actuatable release mechanism 2634a. In this regard, the first actuatable release mechanism 2634a is configured to, when actuated, trigger the launcher 2612 to eject the counterweight housed therein from the chamber 2731. For example, the first release servo may be configured to release a catch 2726 to eject the counterweight housed in the chamber 2731. For example, the release controller may be configured to handle release logic based on manual operator input or automation. For example, an operator may manually control release via an operator input (e.g., a release command signal by pressing a button) or the release controller may automatically trigger the release based on sensor data (e.g., when determined to reach a target release position).

In various second example embodiments, a container (e.g., a cylindrical container such as a discarding sabot) 2718 may be provided for accommodating the counterweight and a portion of the tether therein in a stored state, whereby the container 2718 is in turn housed inside a chamber or cavity 2731 of the launcher 2612. For example, the container 2718 serves to cocoon the counterweight and the portion of the tether to prevent (1) the undesirable or unintended release while the aerial vehicle 2302 is in flight, and (2) for smooth ejection out of the launcher 2612. Once the container 2718 leaves the launcher 2612, the tether and the aerodynamic force of the counterweight upon ejection split the container 2718 apart to expose the counterweight and the portion of the tether that were being accommodated in the container

2718. The tether then proceeds to extend due to the counterweight's residual momentum from the ejection. The launcher 2612 comprises a body or housing 2720 configured to house or encase slide rails 2722 and the sabot 2718 (when the sabot 2718 is in a retracted or stored state). The charging handle 2714 may be configured as a moving sled on the slide rails 2722 that allows a user to manually prime the launcher 2612. In this regard, a latching rod 2724 engages a catch 2726, and together with the compression plate 2728, keeps the spring under compression. A sabot retention tab 2730 may be provided to provide mechanical resistance while the aerial payload deployment system 2600 is in flight so as to prevent the counterweight from sliding out of the chamber 2731. Upon release of the catch 2726 (i.e., when the first actuatable release mechanism 2634a is actuated), the charging handle 2714 is pushed forward by the spring, which consequently ejects the sabot 2718 out of the chamber 2731. The combination of air drag and momentum then separates the counterweight from the sabot 2718, resulting in the extension of the tether.

Figure 28:
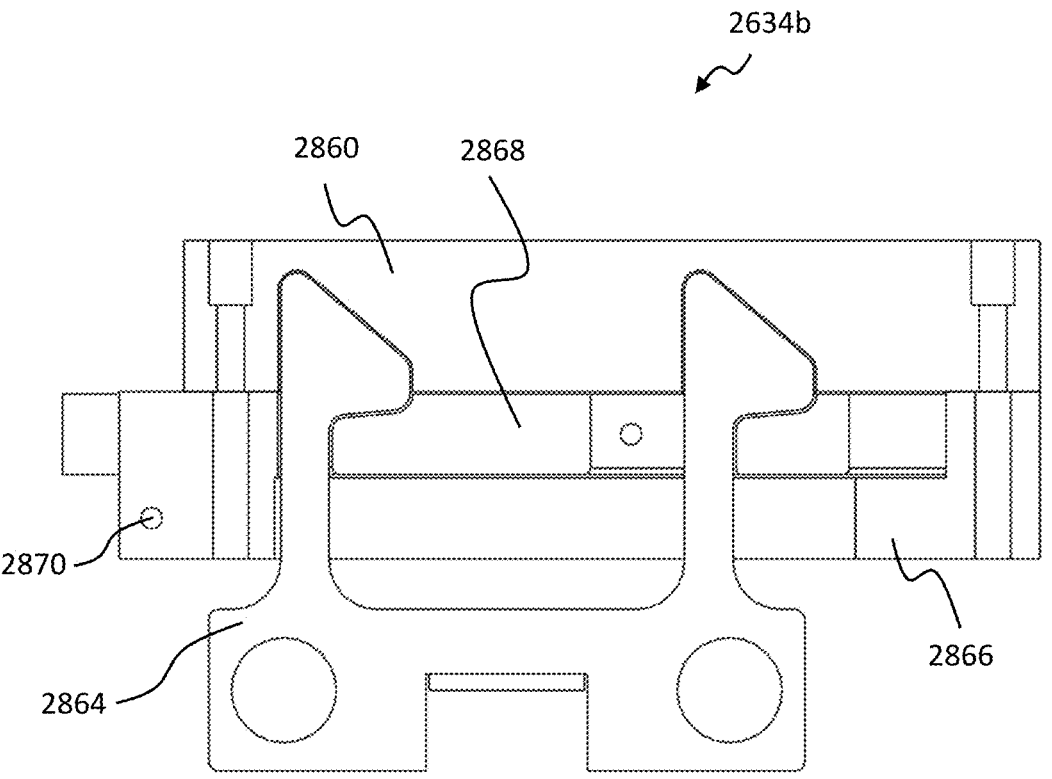
FIG. 28 depicts a schematic drawing of a side view of a second actuatable release mechanism, according to various second example embodiments of the present invention.

FIG. 28 depicts a schematic drawing of a side view of the second actuatable release mechanism 2634b according to various second example embodiments of the present invention. The second actuatable release mechanism 2634b comprises a mount plate 2860 (including a peg receptacle), a payload mounting peg 2864, a slide support bar 2866 and a slide catch 2868. For example, spring mounting holes 2870 may also be provided to provide fixation of a tension spring to the slide support bar 2866 and the slide catch 2868, which keep the slide catch 2868 closed (in a locked state). When the slide catch 2868 is closed, the payload mounting peg 2864 that has payload affixed or secured thereto is prevented from being released. The matching geometry of the peg receptacle in the mount peg 2860 reduces mechanical play in the second actuatable release mechanism 2634b in flight. In various second example embodiments, the second actuatable release mechanism 2634b may be actuated by controlling a second release servo to push the slide catch 2868 to a released state (e.g., to the right) so as to clear the payload mounting peg 2860 from interference from (being engaged with) the slide catch 2868. In this manner, the payload and accompanying payload mounting peg 2864 are released from the aerial vehicle 2302.

Figure 29A:
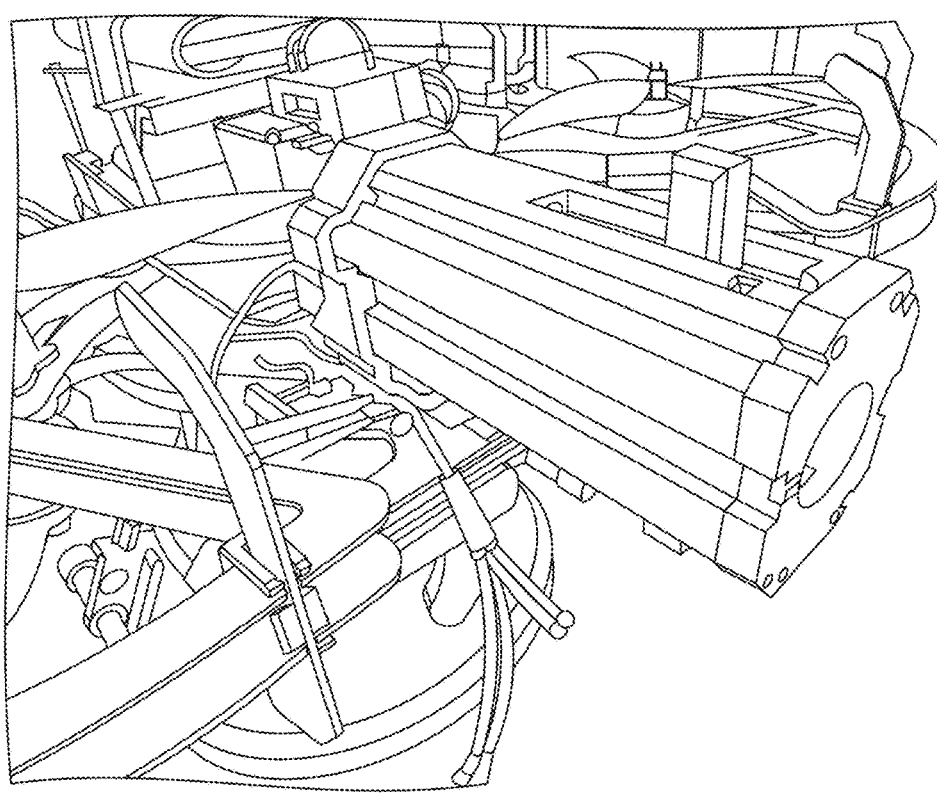
FIGS. 29A and 29B show photos of a perspective view of and a top view of the launcher, according to various second example embodiments of the present invention.
Figure 29B:
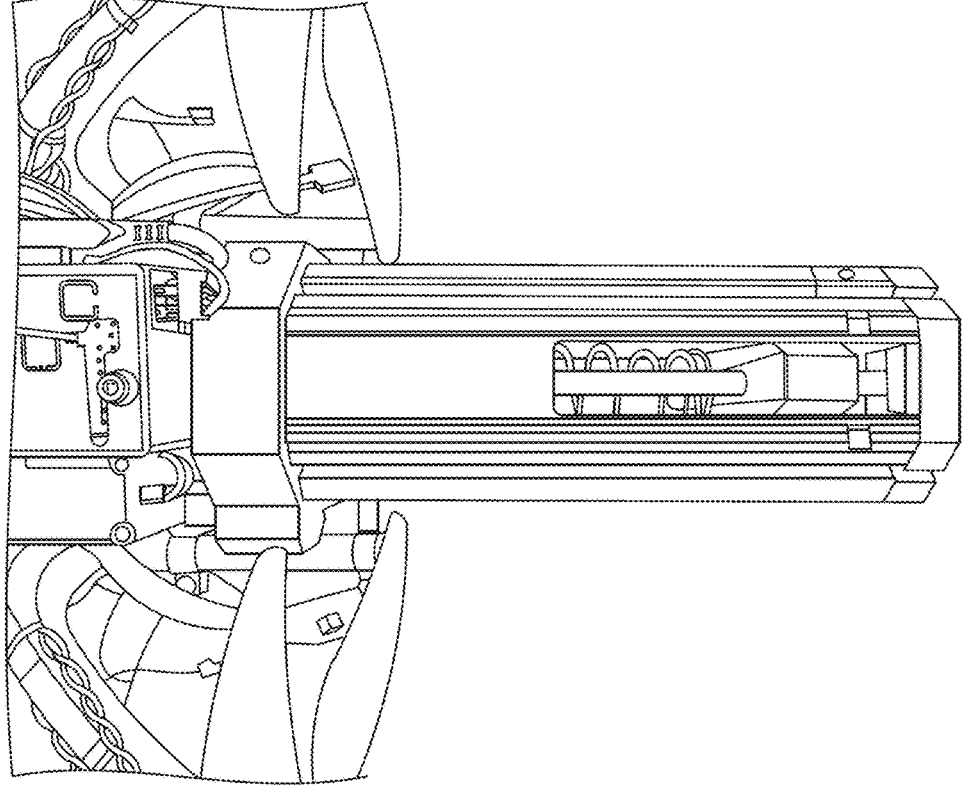
Figure 30B:
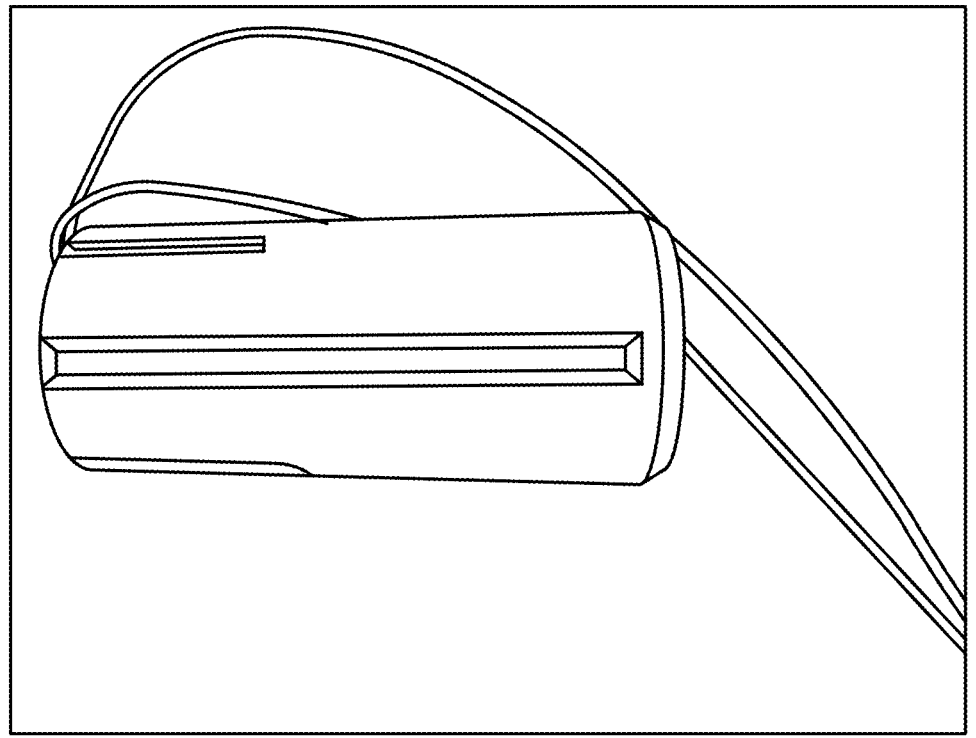
FIGS. 30A and 30B show photos of a container accommodating the counterweight and a portion of the tether therein in a stored state, with a side wall removed and with the side wall in place, respectively, according to various second example embodiments of the present invention.
Figure 30A:
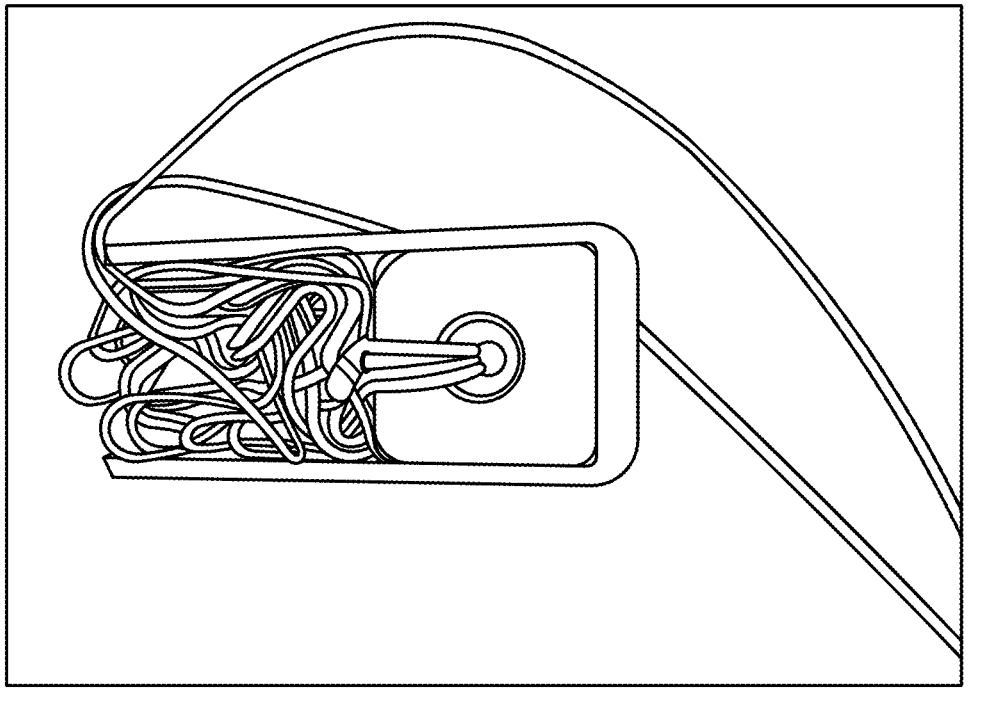
Figures 31A, 31B:
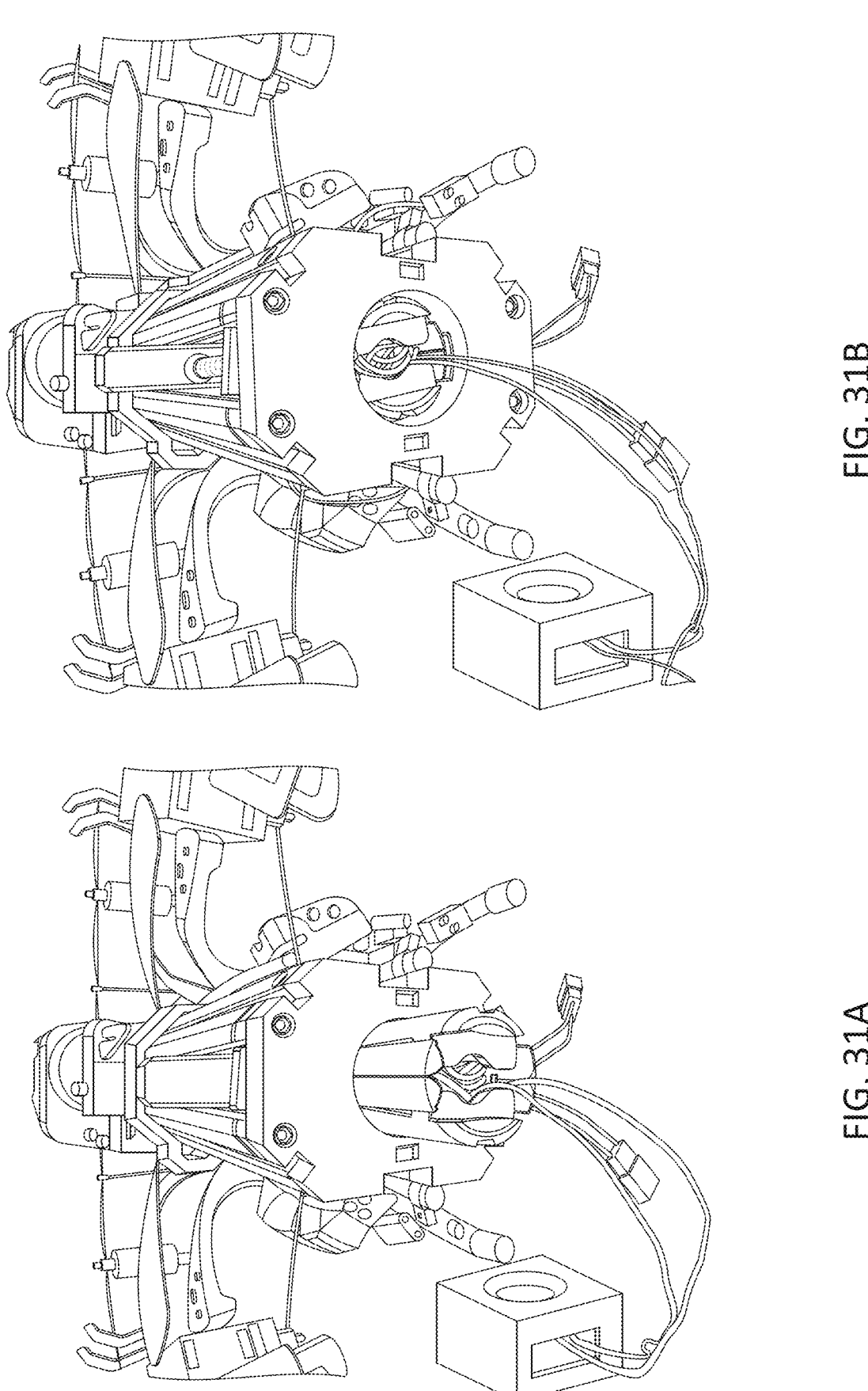
FIGS. 31A and 31B show photos of a front view of the launcher with the container (having the counterweight and the portion of the tether stored therein) being inserted in the chamber of cavity of the launcher, according to various second example embodiments of the present invention.

FIGS. 29A and 29B show photos of a perspective view of and a top view of the launcher 2612 according to various second example embodiments of the present invention. FIGS. 30A and 30B show photos of a container 2718 accommodating the counterweight and a portion of the tether therein in a stored state, with a top cover removed and with the top cover in place, respectively, according to various second example embodiments of the present invention. FIGS. 31A and 31B show photos of a front view of the launcher 2612 with the container (having the counterweight and the portion of the tether stored therein) being inserted in the chamber of cavity of the launcher 2612, according to various second example embodiments of the present invention.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. An aerial payload deployment system comprising:
an aerial vehicle comprising a flight controller operable to control a flight of the aerial vehicle; and
a payload deployment system coupled or couplable to the aerial vehicle and configured to deploy a payload to an elevated lateral pole-like structure, the payload deployment system comprising:
a tethered payload system comprising: a tether having a first end portion and a second end portion; and a counterweight coupled to the first end portion of the tether, the second end portion of the tether being coupled or couplable to the payload to be deployed; and
a payload release system configured to releasably secure the tethered payload system and is actuatable to release the tethered payload system in a manner such that when the tethered payload system descends towards the elevated lateral pole-like structure after being released for the elevated lateral pole-like structure, the counterweight is spaced laterally apart from the payload, and the payload and the counterweight are at opposite sides of the elevated lateral pole-like structure when the tether reaches and contacts with the elevated lateral pole-like structure.

2. The aerial payload deployment system according to claim 1, wherein the tethered payload system is configured such that, after the tether reaches and contacts with the elevated lateral pole-like structure, the counterweight rotates about the elevated lateral pole-like structure thereby causing a portion of the tether up to the first end portion to wrap around the elevated lateral pole-like structure until the counterweight engages therewith and thereby securing the payload to the elevated lateral pole-like structure.

3. The aerial payload deployment system according to claim 1, wherein the counterweight is magnetic for facilitating engagement with the elevated lateral pole-like structure for securing the payload to the elevated lateral pole-like structure.

4. The aerial payload deployment system according to claim 1, wherein the counterweight is lighter than the payload and a weight ratio of the payload to the counterweight is up to about 6:1.

5. The aerial payload deployment system according to claim 3, wherein the counterweight is lighter than the payload and a weight ratio of the payload to the counterweight is up to about 12:1.

6. The aerial payload deployment system according to claim 1, wherein
the payload deployment system comprises an elongated frame structure, and
the payload release system comprises:
a first actuatable release mechanism and a second actuatable release mechanism located at a first section and a second section, respectively, of the elongated frame structure, wherein the first and second sections are spaced apart from each other and the first and second actuatable release mechanisms are configured to releasably secure the counterweight and the payload, respectively; and
a release controller communicatively coupled to the first and second actuatable release mechanisms and is operable to actuate the first and second actuatable release mechanisms to release the counterweight and the payload, respectively.

7. The aerial payload deployment system according to claim 6, wherein the first and second sections are spaced apart from each other with a distance therebetween of about 50% to 100% of an entire operating length of the tether.

8. The aerial payload deployment system according to claim 1, wherein the payload deployment system comprises a launcher comprising a chamber for housing the counterweight, and the payload release system comprises:

a first actuatable release mechanism configured to, when actuated, trigger the launcher to eject the counterweight from the chamber such that the counterweight is spaced laterally apart from the payload after being released for the elevated lateral pole-like structure;

a second actuatable release mechanism configured to releasably secure the payload; and a release controller communicatively coupled to the first and second actuatable release mechanisms and is operable to actuate the first and second actuatable release mechanisms to trigger the launcher and release the payload, respectively.

9. The aerial payload deployment system according to claim 8, wherein the release controller is configured to release the payload about 0.1 to 1 second after the launcher is triggered to eject the counterweight from the chamber.

10. A method of operating the aerial payload deployment system according to claim 1, the method comprising:

navigating, based on a flight navigation command signal for controlling a movement of the aerial vehicle received by the flight controller of the aerial vehicle, the aerial vehicle to a position above an elevated lateral pole-like structure for deploying a payload to the elevated lateral pole-like structure; and actuating the payload release system to release the tethered payload system in a manner such that when the tethered payload system descends towards the elevated lateral pole-like structure after being released for the elevated lateral pole-like structure, the counterweight is spaced laterally apart from the payload, and the payload and the counterweight are at opposite sides of the elevated lateral pole-like structure when the tether reaches and contacts with the elevated lateral pole-like structure.

11. The method according to claim 10, wherein after the tether reaches and contacts with the elevated lateral pole-like structure, the counterweight rotates about the elevated lateral pole-like structure thereby causing a portion of the tether up to the first end portion to wrap around the elevated lateral pole-like structure until the counterweight engages therewith and thereby securing the payload to the elevated lateral pole-like structure.

12. The method according to claim 10, wherein when the tether reaches and contacts with the elevated lateral pole-like structure, a ratio of a length of a portion of the tether from the second end portion to a point of contact with the elevated lateral pole-like structure to an entire operating length of the tether is in a range of about 0.25 to 0.5.

13. The method according to claim 10, wherein said position of the aerial vehicle above the elevated lateral pole-like structure for deploying the payload to the elevated lateral pole-like structure is such that the tethered payload system held by the aerial vehicle is at least about 0.5 m above the elevated lateral pole-like structure.

14. A method of forming an aerial payload deployment system, the method comprising:

providing or forming an aerial vehicle comprising a flight controller operable to control a flight of the aerial vehicle; and providing or forming a payload deployment system coupled or couplable to the aerial vehicle and configured to deploy a payload to an elevated lateral pole-like structure, the payload deployment system comprising:

a tethered payload system comprising: a tether having a first end portion and a second end portion; and a counterweight coupled to the first end portion of the tether, the second end portion of the tether being coupled or couplable to the payload to be deployed; and a payload release system configured to releasably secure the tethered payload system and is actuatable to release the tethered payload system in a manner such that when the tethered payload system descends towards the elevated lateral pole-like structure after being released for the elevated lateral pole-like structure, the counterweight is spaced laterally apart from the payload, and the payload and the counterweight are at opposite sides of the elevated lateral pole-like structure when the tether reaches and contacts with the elevated lateral pole-like structure.

15. The method according to claim 14, wherein the tethered payload system is configured such that, after the tether reaches and contacts with the elevated lateral pole-like structure, the counterweight rotates about the elevated lateral pole-like structure thereby causing a portion of the tether up to the first end portion to wrap around the elevated lateral pole-like structure until the counterweight engages therewith and thereby securing the payload to the elevated lateral pole-like structure.

16. The method according to claim 14, wherein the counterweight is magnetic for facilitating engagement with the elevated lateral pole-like structure for securing the payload to the elevated lateral pole-like structure.

17. The method according to claim 14, wherein the counterweight is lighter than the payload and a weight ratio of the payload to the counterweight is up to about 6:1.

18. The method according to claim 16, wherein the counterweight is lighter than the payload and a weight ratio of the payload to the counterweight is up to about 12:1.

19. The method according to claim 14, wherein the payload deployment system comprises an elongated frame structure, and the payload release system comprises:

a first actuatable release mechanism and a second actuatable release mechanism located at a first section and a second section, respectively, of the elongated frame structure, wherein the first and second sections are spaced apart from each other and the first and second actuatable release mechanisms are configured to releasably secure the counterweight and the payload, respectively; and a release controller communicatively coupled to the first and second actuatable release mechanisms and is operable to actuate the first and second actuatable release mechanisms to release the counterweight and the payload, respectively.

20. The method according to claim 19, wherein the first and second sections are spaced apart from each other with a distance therebetween of about 50% to 100% of an entire operating length of the tether.

21. The method according to claim 14, wherein the payload deployment system comprises a launcher comprising a chamber for housing the counterweight, and the payload release system comprises:

a first actuatable release mechanism configured to, when actuated, trigger the launcher to eject the counterweight from the chamber such that the counterweight is spaced laterally apart from the payload after being released for the elevated lateral pole-like structure;

a second actuatable release mechanism configured to releasably secure the payload; and a release controller communicatively coupled to the first and second actuatable release mechanisms and is operable to actuate the first and second actuatable release mechanisms to trigger the launcher and release the payload, respectively.

22. The method according to claim 21, wherein the release controller is configured to release the payload about 0.1 to 1 second after the launcher is triggered to eject the counterweight from the chamber.

\* \* \* \* \*